United States Patent
Ito

(10) Patent No.: US 9,385,861 B2
(45) Date of Patent: Jul. 5, 2016

(54) WIRELESS DEVICE AND METHOD FOR CONTROLLING WIRELESS DEVICE

(71) Applicant: FUJITSU LIMITED, Kawasaki-shi, Kanagawa (JP)

(72) Inventor: Tsutomu Ito, Sendai (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/682,724

(22) Filed: Apr. 9, 2015

(65) Prior Publication Data

US 2015/0358149 A1 Dec. 10, 2015

(30) Foreign Application Priority Data

Jun. 9, 2014 (JP) ................................. 2014-118782

(51) Int. Cl.
*H04L 7/033* (2006.01)

(52) U.S. Cl.
CPC .................................. *H04L 7/0332* (2013.01)

(58) Field of Classification Search
USPC ......................................... 375/267, 259, 343
See application file for complete search history.

(56) References Cited

U.S. PATENT DOCUMENTS

| 5,898,924 | A * | 4/1999 | Korpi et al. | 455/437 |
| 8,509,708 | B2 * | 8/2013 | Zhang et al. | 455/73 |
| 2013/0202069 | A1 * | 8/2013 | Nilsson | H04L 27/2657 375/343 |
| 2014/0241442 | A1 * | 8/2014 | Ahmadi et al. | 375/259 |
| 2014/0362936 | A1 * | 12/2014 | Tang et al. | 375/267 |

FOREIGN PATENT DOCUMENTS

| JP | 2007-306358 | 11/2007 |
| JP | 2010-145276 | 7/2010 |

OTHER PUBLICATIONS

3GPP TS 25.101, V12.3.0, "Technical Specification Group Radio Access Network; User Equipment (UE) radio transmission and reception (FDD) (Release 12)", [online], Mar. 2014 [retrieved on May 14, 2014], Internet <URL: http://www.3gpp.org/ftp/Specs/archive/25_series/25.101/25101-c30.zip>.

3GPP TS 36.101, V12.1.0, "Technical Specification Group Radio Access Network; Evolved Universal Terrestrial Radio Access (E-UTRA); User Equipment (UE) radio transmission and reception (Release 12)", [online], Sep. 2013 [retrieved on May 14, 2014], Internet <URL:http://www.3gpp.org/ftp/Specs/archive/36_series/36.101/36101-c30.zip>.

* cited by examiner

*Primary Examiner* — Eva Puente
(74) *Attorney, Agent, or Firm* — Fujitsu Patent Center

(57) ABSTRACT

A wireless device including an oscillator circuit, a detector circuit, and a controller circuit. The oscillator circuit generate a clock signal. The detector circuit detect respective phase differences of received wireless signals of a plurality of frequency bands from respective reference phases. The controller circuit control, for each of the plurality of frequency bands, at least one of a receiving process and a transmitting process on the wireless signal on the basis of the clock signal such that the phase difference is compensated.

17 Claims, 34 Drawing Sheets

WIRELESS DEVICE AND METHOD FOR CONTROLLING WIRELESS DEVICE

CROSS-REFERENCE TO RELATED APPLICATION

This application is based upon and claims the benefit of priority of the prior Japanese Patent application No. 2014-118782, filed on Jun. 9, 2014, the entire contents of which are incorporated herein by reference.

FIELD

The embodiments discussed herein relate to a wireless device and a method for controlling a wireless device.

BACKGROUND

There has been known a wireless communication system including a mobile station and a base station (see, for example, Patent Literature 1, Non-Patent Literature 1 and Non-Patent Literature 2). Such a wireless communication system carries out Auto Frequency Control (AFC) that approximates the frequency of the mobile station to that of the base station.

For example, the mobile station accomplishes AFC by: receiving a signal transmitted from the base station; and correcting the frequency of a clock signal to be generated by an oscillator circuit so as to compensate for the phase difference of the received signal from a certain reference phase.

The Third Generation Partnership Project (3GPP) restricts the allowable error of the frequency of a mobile station compared to that of a base station to 0.1 ppm. The unit "ppm" is abbreviation for Parts Per Million.

Accordingly, when a carrier wave has a frequency of 2 GHz, the frequency band corresponding to 0.1 ppm is 200 Hz. When a carrier wave has a frequency of 800 MHz, the frequency band corresponding to 0.1 ppm is 80 Hz. Therefore the allowable error of the frequency of a mobile station compared to the frequency of a base station is different with a frequency band used for communication between the mobile station and the base station.

[Patent Literature 1] Japanese Laid-Open Patent Publication No. 2010-145276

[Non-Patent Literature 1] 3GPP TS 25.101 V12.3.0, "Technical Specification Group Radio Access Network; User Equipment (UE) radio transmission and reception (FDD) (Release 12)", [online], March, 2014 [retrieved on May 14, 2014], Internet
<URL:http://www.3gpp.org/ftp/Specs/archive/25_serie s/25.101/25101-c30.zip>

[Non-Patent Literature 2] 3GPP TS 36.101 V12.1.0, "Technical Specification Group Radio Access Network; Evolved Universal Terrestrial Radio Access (E-UTRA); User Equipment (UE) radio transmission and reception (Release 12)", [online], September, 2013 [retrieved on May 14, 2014], Internet
<URL:http://www.3gpp.org/ftp/Specs/archive/36_serie s/36.101/36101-c30.zip>

SUMMARY

For example, when multiple data series are communicated in parallel using a single frequency band as performed in the communication complying with the Multiple-Input and Multiple-Output (MIMO) scheme, errors of the frequencies of mobile stations compared with the frequency of the base station are roughly the same between the data series. Here, examples of the frequency band are a band, a main band, a sub-band, and a channel. Accordingly, if AFC successfully controls an error of a single data series to fall within the allowable error, the errors of the remaining data series can be controlled likewise.

However, if AFC is carried out on a single frequency band under a state where multiple frequency bands are used, the errors of the remaining frequency bands may sometimes exceed the allowable errors, which would degrade the communication quality.

As an aspect of the embodiments, there is provided a wireless device including: an oscillator circuit that generates a clock signal; a detector circuit that detects respective phase differences of received wireless signals of a plurality of frequency bands from respective reference phases; and a controller circuit that controls, for each of the plurality of frequency bands, at least one of a receiving process and a transmitting process on the wireless signal on the basis of the clock signal such that the phase difference is compensated.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, the embodiments of the present disclosure will be described with reference to the accompanying drawings. The following embodiments are exemplary, so there is no intention to exclude application of various modifications and techniques not suggested in the following description to the embodiments. Throughout accompanying drawings of the embodiments, like reference numbers designate the same or substantially identical parts and elements unless modifications and changes are specified otherwise.

<First Embodiment>

Figure 1:
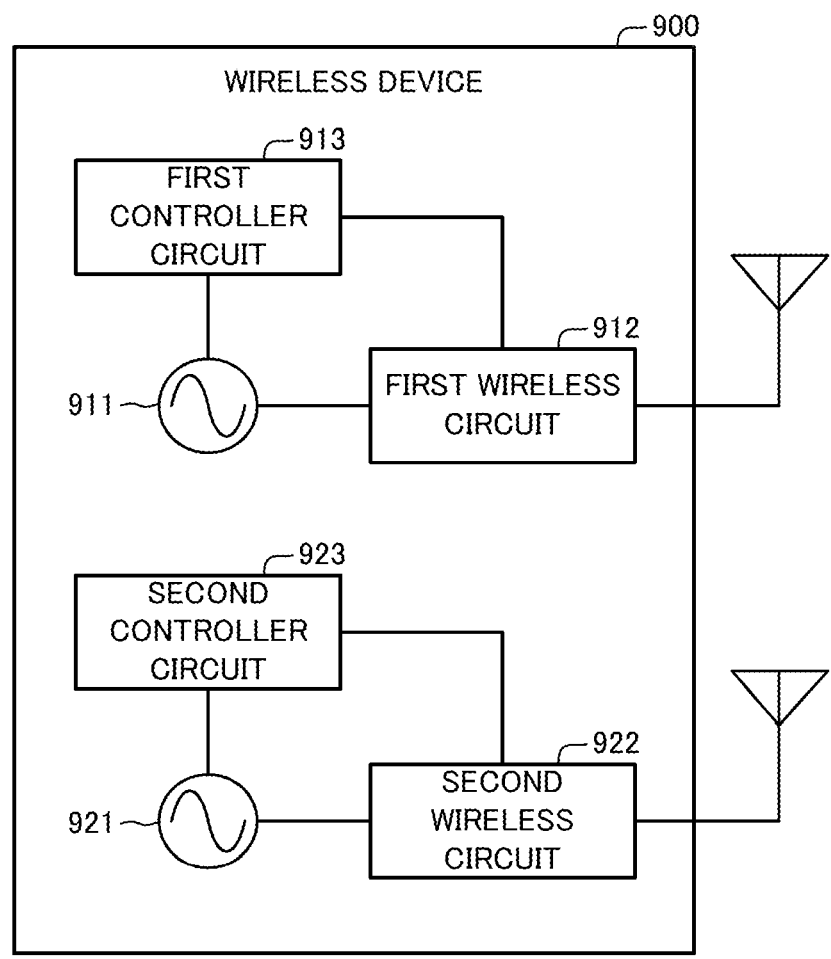
FIG. 1 is a block diagram schematically illustrating an example of the configuration of a wireless device.

Under a state where multiple frequency bands are used, AFC may be carried out on each of the multiple frequency bands. As illustrated in the example of FIG. 1, a wireless device 900 includes a first wireless circuit 912, a first controller circuit 913, and a first oscillator circuit 911 for a first frequency band and also includes a second wireless circuit 922, a second controller circuit 923, and a second oscillator circuit 921 for a second frequency band. The first controller circuit 913 and the second controller circuit 923 correct the frequencies of the clock signals to be respectively generated by the first oscillator circuit 911 and the second oscillator circuit 921 such that the phase differences of the respective received signals of the first frequency band and the second frequency band can be compensated.

However, the presence of multiple oscillator circuits 911 and 921 increases the size of the wireless device 900 as compared with cases where a single oscillator circuit is included. In addition, the presence of the multiple oscillator circuits 911 and 921 also increases the manufacturing costs for the wireless device 900 as compared with cases where a single oscillator circuit is included.

In contrast, a wireless device according to a first embodiment includes an oscillator circuit, a detector circuit, and a controller circuit. The oscillator circuit generates a clock signal; the detector circuit detects respective phase differences of received wireless signals of multiple frequency bands from respective reference phases; and the controller circuit controls, for each of the multiple frequency bands, at least one of a receiving process and a transmitting process on the wireless signal on the basis of the clock signal such that the phase difference is compensated.

This can compensate for phase differences of wireless signals of the multiple frequency bands, so that the communication quality in each frequency band can be enhanced. Advantageously, the configuration of the first embodiment can reduce the size and the manufacturing cost for the wireless device as compared with a wireless device including multiple oscillator circuits.

Hereinafter, description will now be made in relation to a wireless device according to the first embodiment.

(Configuration)

Figure 2:
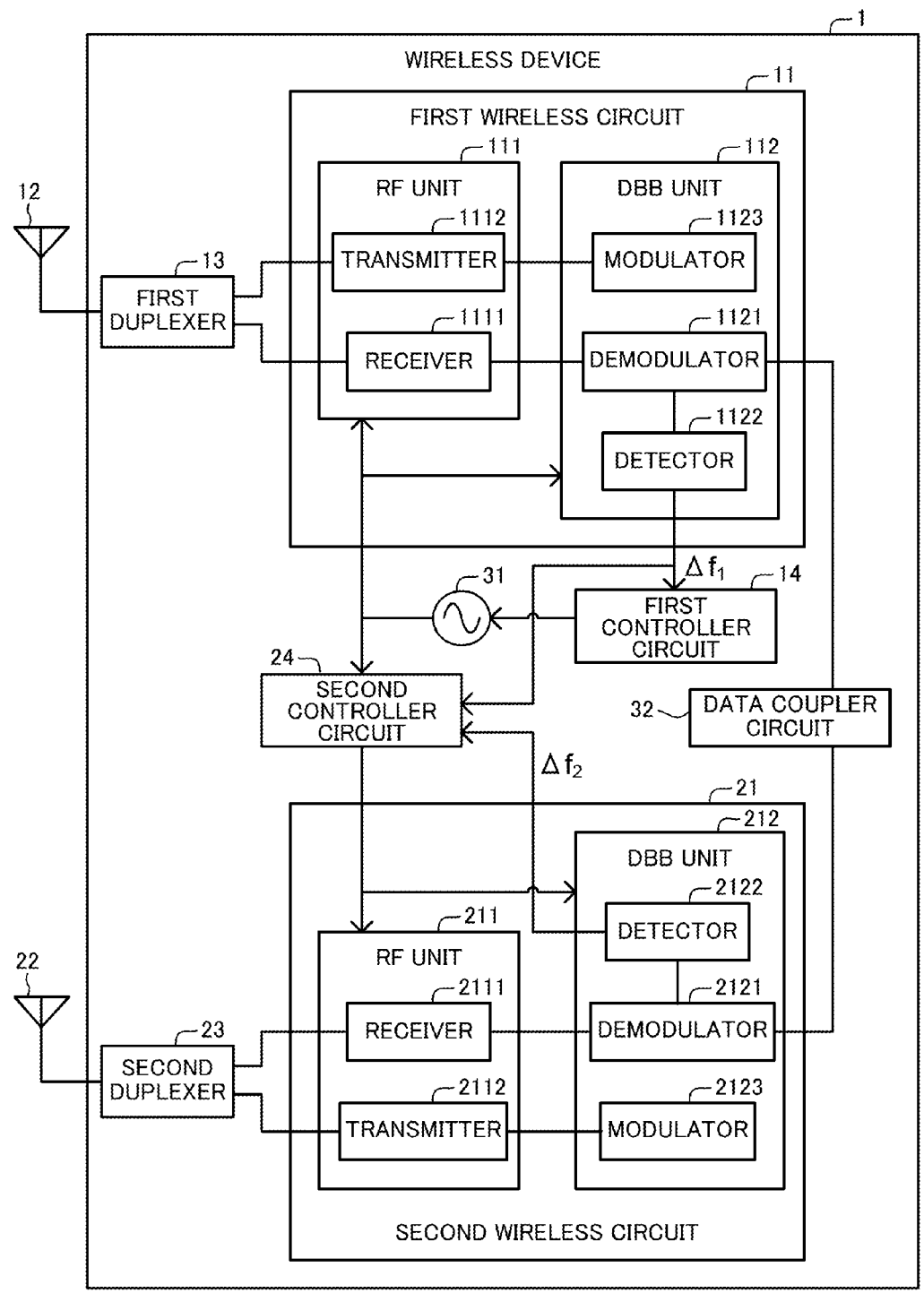
FIG. 2 is a block diagram schematically illustrating an example of the configuration of a wireless device according to a first embodiment.

As illustrated in FIG. 2, the wireless device 1 of the first embodiment transmits and receives a wireless signal to and from another wireless device. Examples of the wireless device 1 are a mobile station, a base station, and a relay station. The mobile station may also be referred to as a wireless terminal, a terminal device, and a User Equipment (UE). In the first embodiment, the wireless device 1 is a mobile station that transmits and receives a wireless signal to and from a base station corresponding to another wireless device. Alternatively, the wireless device 1 may transmit and receive a wireless signal to and from a mobile station or a relay station.

The wireless device 1 exemplarily includes a first wireless circuit 11, a first antenna 12, a first duplexer 13, a first controller circuit 14, a second wireless circuit 21, a second antenna 22, a second duplexer 23, a second controller circuit 24, an oscillator circuit 31, and a data coupler circuit 32.

In the first embodiment, the wireless device 1 carries out communication using a wireless signal of a first frequency band in parallel with communication using a wireless signal of a second frequency band different from the first frequency band. Here, a frequency band may also be referred to as a band, a main band, a sub-band, or a channel.

In this embodiment, the first wireless circuit 11 performs a first wireless process on a wireless signal of the first frequency band while the second wireless circuit 21 performs a second wireless process on a wireless signal of the second frequency band.

For example, the first wireless circuit and the second wireless circuit 21 may perform wireless process conforming to a scheme of the DC-HSDPA, the DC-HSPA, or the DB-HSDPA of High-speed Packet Access (HSPA). Here, the term DC is an abbreviation for Dual Cell; the term HSDPA is an abbreviation for High Speed Downlink Packet Access; and the term DB is an abbreviation for Dual Band.

Alternatively, the first wireless circuit and the second wireless circuit 21 may perform wireless processes for Carrier Aggregation (CA) of the Long Term Evolution Advanced (LTE-Advanced).

Further alternatively, the first wireless circuit 11 and the second wireless circuit 21 may perform wireless processes conforming to different wireless communication schemes (in other words, Radio Access Technology (RAT)). For example, the first wireless circuit 11 may perform a wireless process conforming to the LTE scheme while the second wireless circuit 21 may perform a wireless process conforming to the Wideband Code Division Multiple Access (W-CDMA) scheme or the Wireless Fidelity (Wi-Fi) scheme.

Further alternatively, the first wireless circuit 11 and the second wireless circuit 21 may perform wireless processes for communication of different communication carriers.

The oscillator circuit 31 generates a clock signal having a certain frequency. The oscillator circuit 31 of this embodiment includes a quartz oscillator that can control the frequency of a clock signal to be generated according to the voltage applied thereto. An example of the oscillator is a Voltage Controlled Temperature Compensated Crystal Oscillator (VC-TCXO).

The first wireless circuit 11 operates in response to a clock signal generated by the oscillator circuit 31. The first wireless circuit 11 performs the first wireless process on a wireless signal of the first frequency band. The first wireless process of this embodiment includes both a receiving process that receives a wireless signal and a transmitting process that transmits a wireless signal. Alternatively, the first wireless process may include one of the receiving process and the transmitting process or may include only one of the two process.

The first wireless circuit 11 exemplarily includes a Radio Frequency (RF) unit 111 and a Digital Baseband (DBB) unit 112.

The RF unit 111 processes an analog signal. For example, the RF unit 111 converts a digital signal input from the DBB unit 112 into an analog signal (i.e., performs DA conversion) and also converts an analog signal to be output to the DBB unit 112 into a digital signal (i.e., performs AD conversion).

The RF unit 111 exemplarily includes a receiver 1111 and a transmitter 1112.

The receiver 1111 and the transmitter 1112 are each connected to a first antenna 12 via a first duplexer 13. In other words, the receiver 1111 and the transmitter 1112 share the first antenna 12 by using the first duplexer 13.

Figure 3:
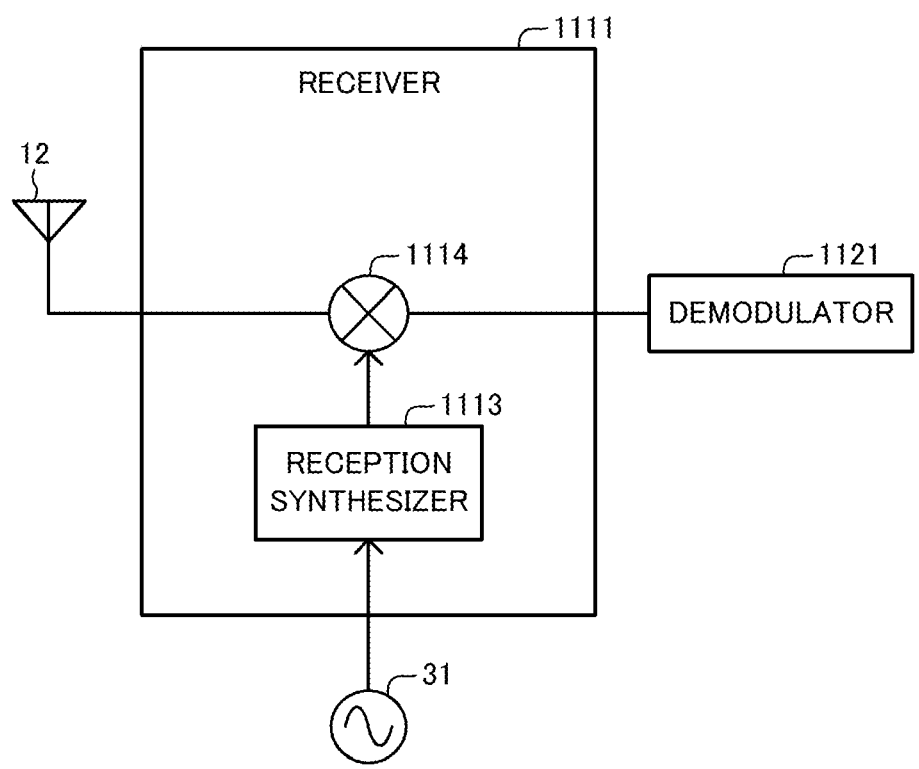
FIG. 3 is a block diagram schematically illustrating an example of the configuration of a receiver of FIG. 2.

As illustrated in FIG. 3, the receiver 1111 exemplarily includes a reception synthesizer 1113 and a multiplier 1114. In this embodiment, the process performed by the receiver 1111 in this embodiment is also referred to as a wireless receiving process.

The reception synthesizer 1113 generates a carrier wave signal having a frequency different from that of the clock signal generated by the oscillator circuit 31, on the basis of the clock signal. In this embodiment, the frequency of the carrier wave signal generated by the reception synthesizer 1113 is included in the first frequency band. An example of the reception synthesizer 1113 is a Phase Locked Loop (PLL) frequency synthesizer. An example of the PLL frequency synthesizer is a digital PLL synthesizer.

The multiplier 1114 multiplies a wireless signal received by the first antenna 12 by the carrier wave signal generated by the reception synthesizer 1113. The term multiplication and the relevant terms may be also referred to as mixing throughout the specification. The multiplier 1114 outputs the signal obtained by the multiplication to a demodulator 1121 that is to be detailed below. The signal output from the multiplier 1114 may be referred to as a "received signal".

Figure 4:
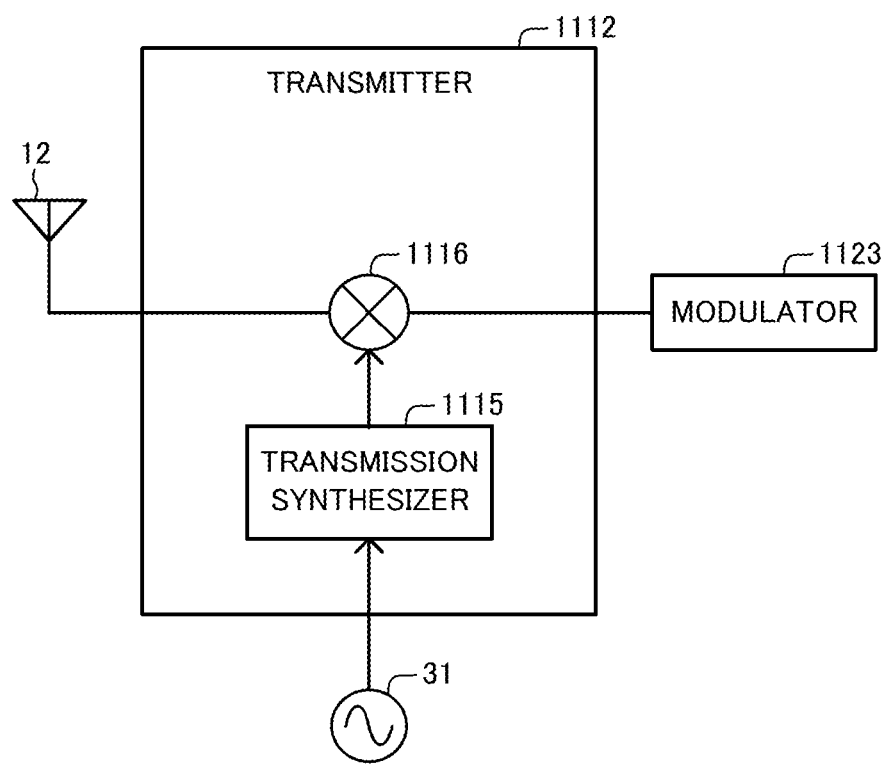
FIG. 4 is a block diagram schematically illustrating an example of the configuration of a transmitter of FIG. 2.

As illustrated in FIG. 4, the transmitter 1112 exemplarily includes a transmission synthesizer 1115 and a multiplier 1116. In this embodiment, the process performed by the transmitter 1112 is also referred to as a wireless transmitting process.

Likewise the reception synthesizer 1113, the transmission synthesizer 1115 generates a carrier wave signal based on the clock signal generated by the oscillator circuit 31. In this embodiment, the transmission synthesizer 1115 generates a carrier wave signal having the same frequency as that of the carrier wave signal generated by the reception synthesizer 1113.

Figure 5:
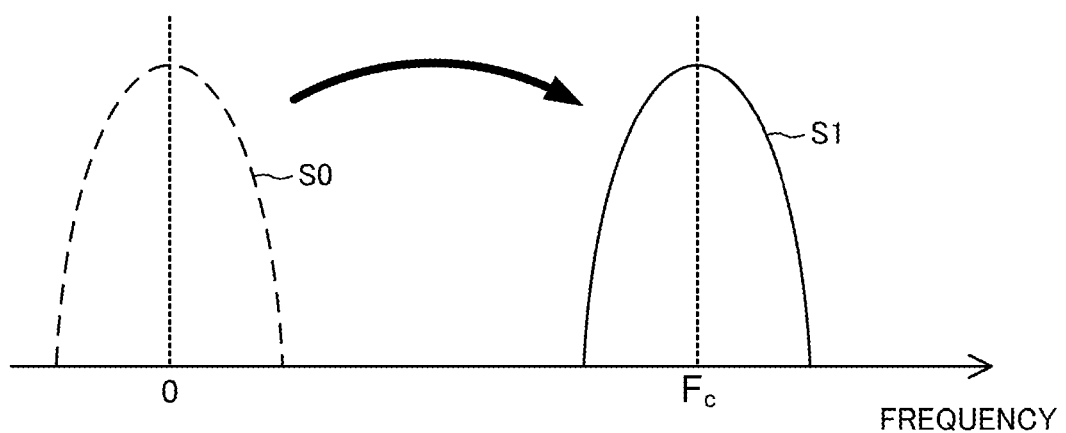
FIG. 5 is a conceptual diagram illustrating an example of a transmission signal before and after being multiplied by a carrier wave signal.

The multiplier 1116 multiplies a transmission signal output from a modulator 1123 that is to be detailed below by the carrier wave signal generated by the transmission synthesizer 1115. The multiplier 1116 outputs the signal obtained by the multiplication therein to the first antenna 12 through the first duplexer 13. As illustrated in the example of FIG. 5, a signal S1 obtained by multiplying the transmission signal S0 by the carrier wave signal having a frequency $F_c$ is transmitted from the first antenna 12.

The DBB unit 112 of FIG. 2 processes a digital signal.

The DBB unit 112 exemplarily includes a demodulator 1121, a detector 1122, and a modulator 1123.

Using the clock signal generated by the oscillator circuit 31, the demodulator 1121 demodulates the received signal output from the receiver 1111 in accordance with a certain modulation scheme. An example of the modulation scheme is a multi-level modulation scheme such as Quadrature Phase-Shift Keying (QPSK), 16 Quadrature Amplitude Modulation (QAM), and 64 QAM. In this embodiment, a process carried out by the demodulator 1121 is also referred to as a demodulating process.

The detector 1122 detects a first phase difference $\Delta f_1$ representing the difference of the phase of the received signal output from the receiver 1111 from a certain reference phase. A phase difference may also be referred to as a phase sift amount or a phase deviation. In this embodiment, a phase difference corresponds to a frequency difference of the frequency of a received signal from a certain reference frequency. For example, a phase difference or a frequency difference corresponds to a difference between a first frequency of a signal generated by another wireless device being the communication counterpart to the wireless device 1 and a second frequency of a signal generated by the wireless device 1 in such a manner that a frequency of the generated signal conforms with the first frequency.

In this embodiment, the detection of a phase difference uses a known signal, which has been known to the wireless device 1 and the other wireless device being the communication counterpart to the wireless device 1. Examples of the known signal is a synchronization signal, a pilot signal, and a reference signal.

In this embodiment, the detector 1122 detects the first phase difference $\Delta f_1$ on the basis of the correlation between the received signal output from the receiver 1111 and the known signal previously stored.

The detector 1122 and a detector 2122 that is to be detailed below are an example of a detector circuit that detects phase differences of wireless signals of the first and second frequency band from the respective reference phases.

On the basis of the clock signal generated by the oscillator circuit 31, the modulator 1123 modulates the transmission signal in a certain modulation scheme. An example of the modulation scheme is a multi-level modulation scheme such as QPSK, 16 QAM, and 64 QAM. The modulator 1123 outputs the modulated transmission signal to the transmitter 1112. In this embodiment, a process carried out by the modulator 1123 is also referred to as a modulating process.

The first controller circuit 14 controls the oscillator circuit 31 to correct the frequency of the clock signal to be generated by the oscillator circuit 31 on the basis of the first phase difference $\Delta f_1$ detected by the detector 1122. In this embodiment, the first controller circuit 14 corrects the frequency of the clock signal by adjusting the voltage to be applied to the quartz oscillator included in the oscillator circuit 31.

In this embodiment, if the detected first phase difference $\Delta f_1$ indicates that the phase of the received signal is advanced over the reference phase of the first frequency band, the first controller circuit 14 determines an adjusting amount of the voltage to be applied so as to increase the frequency of the clock signal. In contrast, if the detected first phase difference $\Delta f_1$ indicates that the phase of the received signal is delayed compared with the reference phase of the first frequency band, the first controller circuit determines an adjusting amount of the voltage to be applied so as to decrease the frequency of the clock signal.

The first controller circuit 14 may previously store the relationship between the phase difference and an adjusting amount of voltage beforehand and determine the adjusting amount of voltage on the basis of the stored relationship and the first phase difference $\Delta f_1$ detected by the detector 1122.

Figure 6:
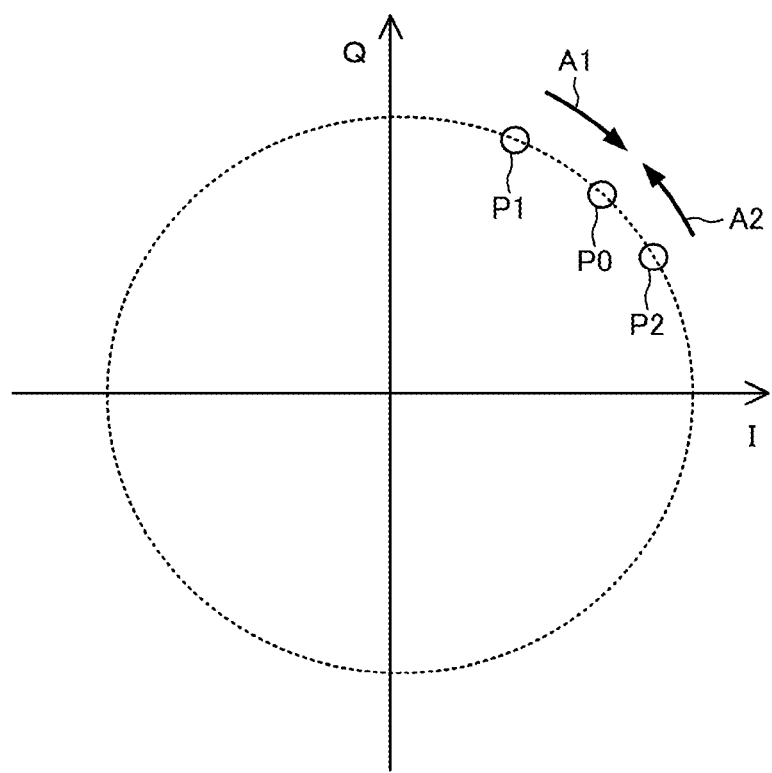
FIG. 6 is a conceptual diagram illustrating an example of relationship between the phase of a reception signal and a reference phase.

As illustrated in the example of FIG. 6, if the phase P1 of the received signal is advanced over the reference phase P0, the frequency of the clock signal is increased. Accordingly, the first wireless process is controlled such that the phase of the received signal is corrected in the direction A1 to approach the reference phase P0.

In contrast, if the phase P2 of the received signal is delayed compared with the reference phase P0, the frequency of the clock signal is decreased. Accordingly, the first wireless process is controlled such that the phase of the received signal is corrected in the direction A2 to approach the reference phase P0.

The first controller circuit 14 controls the first wireless process to compensate for the first phase difference $\Delta f_1$ along the above manner.

Figure 7:
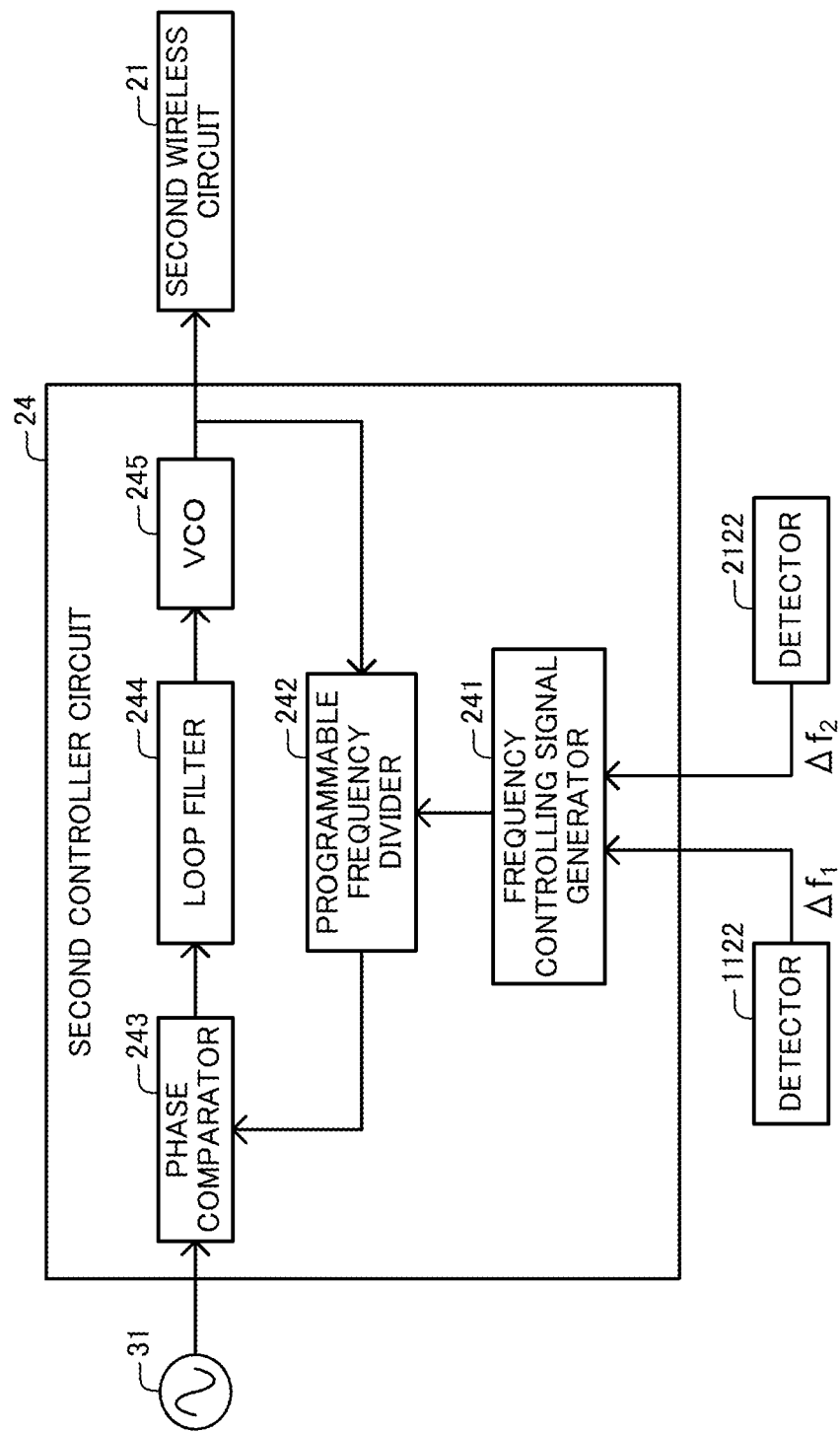
FIG. 7 is a block diagram schematically illustrating an example of the configuration of a second controller circuit of FIG. 2.

As illustrated in FIG. 7, the second controller circuit 24 exemplarily includes a frequency controlling signal generator 241, a programmable frequency divider 242, a phase comparator 243, a loop filter 244, and a Voltage Controlled Oscillator (VCO) 245. The segment formed of the programmable frequency divider 242, the phase comparator 243, the loop filter 244, and the VCO 245 among the elements of the second controller circuit 24 may be referred to as a digital PLL synthesizer.

The frequency controlling signal generator 241 determines a division ratio M based on the first phase difference $\Delta f_1$ detected by the detector 1122 and a second phase difference $\Delta f_2$ detected by a detector 2122 that is to be described below, and outputs a frequency controlling signal representing the determined division ratio M. The division ratio M represents an integer in this embodiment.

For example, the frequency controlling signal generator 241 determines the division ratio M based on the value $\Delta f_2 - \Delta f_1$ calculated by subtracting the first phase difference $\Delta f_1$ from the second phase difference $\Delta f_2$. In this embodiment, a positive phase difference means that the phase of the received signal is advanced over the reference phase. For example, the frequency controlling signal generator 241 determines the division ratio M to have a larger value as the value $\Delta f_2 - \Delta f_1$ increases.

The frequency controlling signal generator 241 may store the relationship between the value $\Delta f_2 - \Delta f_1$ and the division ratio M beforehand and determine the division ratio M based on the stored relationship and the value $\Delta f_2 - \Delta f_1$ calculated from the detected first phase difference $\Delta f_1$ and the detected second phase difference $\Delta f_2$.

The frequency controlling signal generator 241 may use the value $\Delta f_2 - k\Delta f_1$ in place of the value $\Delta f_2 - \Delta f_1$ to determine the division ratio M. Here, k represents a certain factor and may be determined on the basis of a frequency of the first frequency band and a frequency of the second frequency band. Alternatively, the factor k may be based on a ratio of the frequency of a carrier wave signal for the first frequency band to the frequency of a carrier wave signal for the second frequency band.

The programmable frequency divider 242 outputs a divided signal having a frequency $F_M (= F_2/M)$ obtained by dividing the frequency $F_2$ of a clock signal output from the VCO 245 by the division ratio M represented by the frequency controlling signal output from the frequency controlling signal generator 241.

The phase comparator 243 outputs a phase difference signal corresponding to the phase difference between the clock signal output from the oscillator circuit 31 and the divided signal output from the programmable frequency divider 242.

In this embodiment, if the divided signal output from the programmable frequency divider 242 is advanced over the clock signal output from the oscillator circuit 31, the phase difference signal has a value to decrease the frequency of the clock signal to be generated by the VCO 245. In contrast, if the divided signal output from the programmable frequency divider 242 is delayed compared with the clock signal output from the oscillator circuit 31, the phase difference signal has a value to increase the frequency of the clock signal to be generated by the VCO 245.

For example, the phase comparator 243 is achieved by using an Exclusive OR and a charge pump.

The loop filter 244 smooths the phase difference signal and is a low-pass filter in this embodiment.

The VCO 245 includes an oscillator that is capable of controlling the frequency of a signal to be generated according to the voltage to be applied. The VCO 245 generates a clock signal having a frequency corresponding to the phase difference signal smoothed by the loop filter 244.

The VCO 245 outputs the generated clock signal to the second wireless circuit 21. The outputting of a clock signal may be also referred to as supplying of a clock signal.

In this manner, the second controller circuit 24 corrects the frequency of the clock signal output from the oscillator circuit 31 and supplies the corrected clock signal to the second wireless circuit 21. Consequently, the second controller circuit 24 controls the second wireless process by correcting the frequency of the clock signal to be supplied to the second wireless circuit 21.

The second wireless circuit 21 of FIG. 2 operates in response to the clock signal output from the second controller circuit 24. The second wireless circuit 21 carries out a second wireless process on a wireless signal of the second frequency band different from the first frequency band.

The second wireless process of this embodiment includes both a receiving process that receives a wireless signal and a transmitting process that transmits a wireless signal. Alternatively, the second wireless process may include one of the receiving process and the transmitting process or may include only one of the two processes.

The second wireless circuit 21 exemplarily includes an RF unit 211 and a DBB unit 212. The RF unit 211 and the DBB unit 212 have the same functions as those of the RF unit 111 and the RF unit 211, respectively, except for the following first and second differences. The first difference is that the RF unit 211 and the DBB unit 212 operate in response to the clock signal output from the second controller circuit 24 in place of the clock signal output from the oscillator circuit 31. The second difference is that the RF unit 211 and the DBB unit 212 carry out process for the second frequency band in place of the first frequency band.

The RF unit 211 exemplarily includes a receiver 2111 and a transmitter 2112, which have the same functions as those of the receiver 1111 and the transmitter 1112, respectively, except for the above first and second differences.

The DBB unit 212 exemplarily includes a demodulator 2121, the detector 2122, and the modulator 2123. The demodulator 2121, the detector 2122, and the modulator 2123 have the same functions as those of the demodulator 1121, the detector 1122, and the modulator 1123, respectively, except for the above first and second differences. With this configurations and functions, the detector 2122 detects the second phase difference $\Delta f_2$ representing the difference of the phase of the received signal output from the receiver 2111 from the reference phase of the second frequency band.

The data coupler circuit 32 couples the demodulated received signal obtained by the demodulator 1121 and the demodulated received signal obtained by the demodulator 2121.

(Operation)

Here, an example of the operation of the wireless device 1 will now be detailed with reference to FIGS. 2 and 8.

In the first wireless circuit 11, the receiver 1111 receives, through the first antenna 12, a wireless signal of the first frequency band transmitted from the counterpart wireless device, and then outputs the received wireless signal as the received signal. The detector 1122 detects the first phase difference $\Delta f_1$ representing the difference of the phase of the received signal output from the receiver 1111 from the reference phase of the first frequency band (step S101 of FIG. 8).

In the same manner, the receiver 2111 of the second wireless circuit 21 receives a wireless signal of the second frequency band transmitted from the counterpart wireless device through the second antenna 22, and then outputs the received wireless signal as the received signal. The detector 2122 detects the second phase difference $\Delta f_2$ representing the difference of the phase of the received signal output from the receiver 2111 from the reference phase of the second frequency band (step S102 of FIG. 8).

In this embodiment, a known signal used for detecting the phase differences is received in a time slot common to the first wireless circuit 11 and the second wireless circuit 21. The known signal used for detecting the phase differences may be received in a sub-frame or a frame common to the first wireless circuit 11 and the second wireless circuit 21. The known signal used for detecting the phase difference in the first wireless circuit 11 may be received within a certain time period from the timing at which the know signal used for detecting the phase difference in the second wireless circuit 21 is received.

Figure 8:
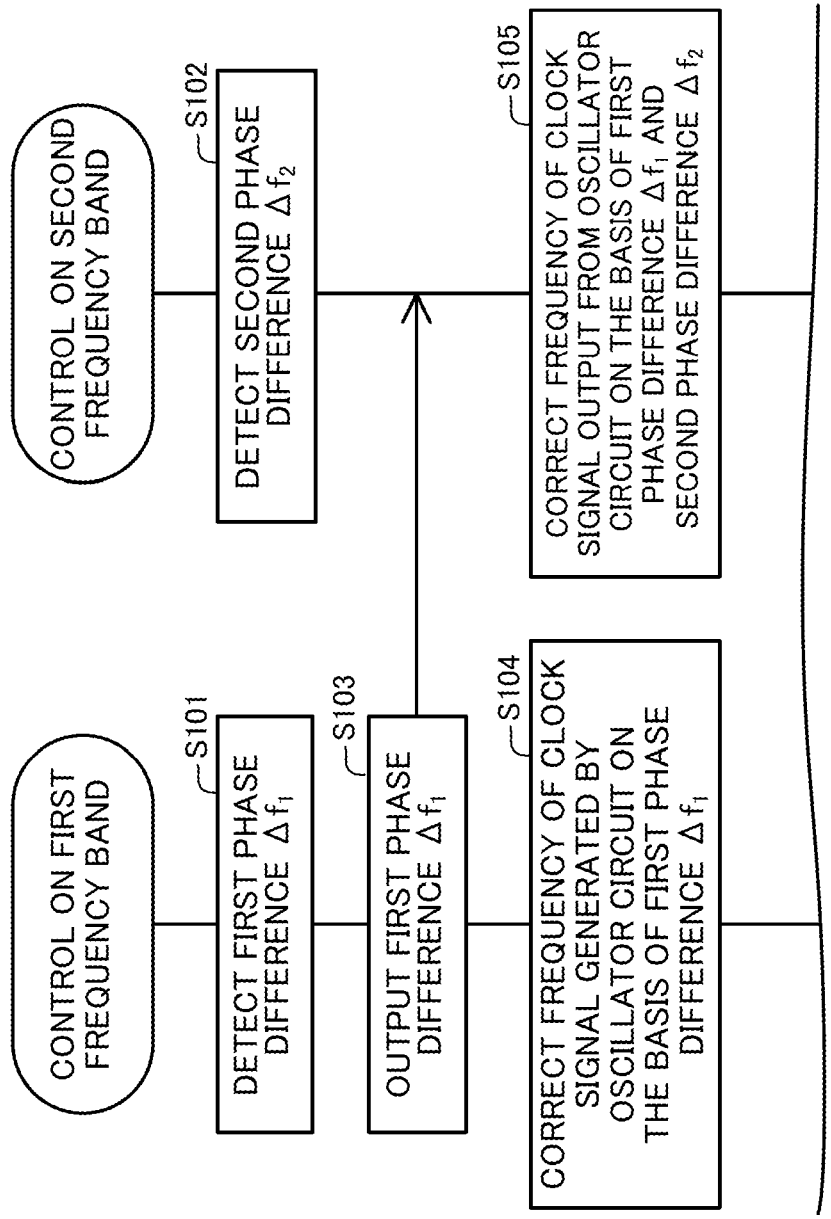
FIG. 8 is a sequential diagram illustrating a succession of procedural steps performed by a wireless device of FIG. 2.

The detector 1122 outputs the detected first phase difference $\Delta f_1$ to the first controller circuit 14 and the second controller circuit 24 (step S103 of FIG. 8).

The first controller circuit 14 controls oscillator circuit 31 such that the frequency of the clock signal generated by the oscillator circuit 31 is corrected on the basis of the first phase difference $\Delta f_1$ detected by the detector 1122 (step S104 of FIG. 8).

The second controller circuit 24 corrects the frequency of the clock signal output from the oscillator circuit 31 on the basis of the first phase difference $\Delta f_1$ detected by the detector 1122 and the second phase difference $\Delta f_2$ detected by the detector 2122 (step S105 of FIG. 8). Here, step S104 and step S105 of FIG. 8 may be carried out in parallel or in substantially parallel with each other.

The second controller circuit 24 supplies the corrected clock signal to the second wireless circuit 21. Along the above manner, the second controller circuit 24 controls the second wireless process by correcting the frequency of the clock signal to be supplied to the second wireless circuit 21.

As described above, the wireless device 1 of the first embodiment includes the oscillator circuit 31, the detectors 1122 and 2122, the first controller circuit 14, and the second controller circuit 24. The oscillator circuit 31 generates the clock signal. The detector 1122 detects the first phase difference $\Delta f_1$ of a wireless signal of the first frequency band from the corresponding reference phase. The detector 2122 detects the second phase difference $\Delta f_2$ of a wireless signal of the second frequency band from the corresponding reference phase. The first controller circuit 14 controls the first wireless process for the first frequency band such that the first phase difference $\Delta f_1$ is compensated while the second controller circuit 24 controls the second wireless process for the second frequency band such that the second phase difference $\Delta f_2$ is compensated.

This can compensate for the respective phase differences of wireless signals of the first and the second frequency bands. Consequently, the communication quality of the respective frequency bands can be enhanced. Furthermore, this configuration allows the wireless device 1 to be more compact and have less manufacturing cost as compared to a device including multiple VC-TCXOs.

In the wireless device 1 of the first embodiment, the first controller circuit 14 controls the first wireless process by correcting the frequency of the clock signal to be supplied to the first wireless circuit 11. In addition, the second controller circuit 24 controls the second wireless process by correcting the frequency of the clock signal to be supplied to the second wireless circuit 21.

Accordingly, it is possible to compensate for the phase differences of the received wireless signals for the first and second frequency bands.

Furthermore, in the wireless device 1 of the first embodiment, the first controller circuit controls the oscillator circuit 31 so as to correct the frequency of the clock signal to be generated by the oscillator circuit 31 on the basis of the first phase difference $\Delta f_1$ of the first frequency band. In addition, the second controller circuit 24 corrects the frequency of the clock signal output from the oscillator circuit 31 on the basis of the first phase difference $\Delta f_1$ of the first frequency band and the second phase difference $\Delta f_2$ of the second frequency band. The second controller circuit 24 supplies the corrected clock signal to the second wireless circuit 21.

The above means that the frequency of the clock signal to be generated by the oscillator circuit 31 is corrected on the basis of the first phase difference $\Delta f_1$ of the first frequency band. Accordingly, the first phase difference $\Delta f_1$ of the first frequency band can be compensated. Furthermore, the frequency of the clock signal output from the oscillator circuit 31 is corrected on the basis of the first phase difference $\Delta f_1$ of the first frequency band and the second phase difference $\Delta f_2$ of the second frequency band. Accordingly, both the first phase difference $\Delta f_1$ of the first frequency band and the second phase difference $\Delta f_2$ of the second frequency band can be reflected in the frequency of the clock signal to be supplied to the second wireless circuit 21. Consequently, the second phase difference $\Delta f_2$ of the second frequency band can be compensated.

<First Modification to the First Embodiment>

Next, description will now be made in relation to a wireless device according to a first modification to the first embodiment. The wireless device of the first modification to the first embodiment is different from the wireless device 1 of the first embodiment in the point that the digital PLL synthesizer is replaced by an All Digital PLL (ADPLL) synthesizer. Hereinafter, the description will mainly focus on the difference. In this modification, like reference numbers designate the same or the substantially same elements and parts of the first embodiment.

Figure 9:
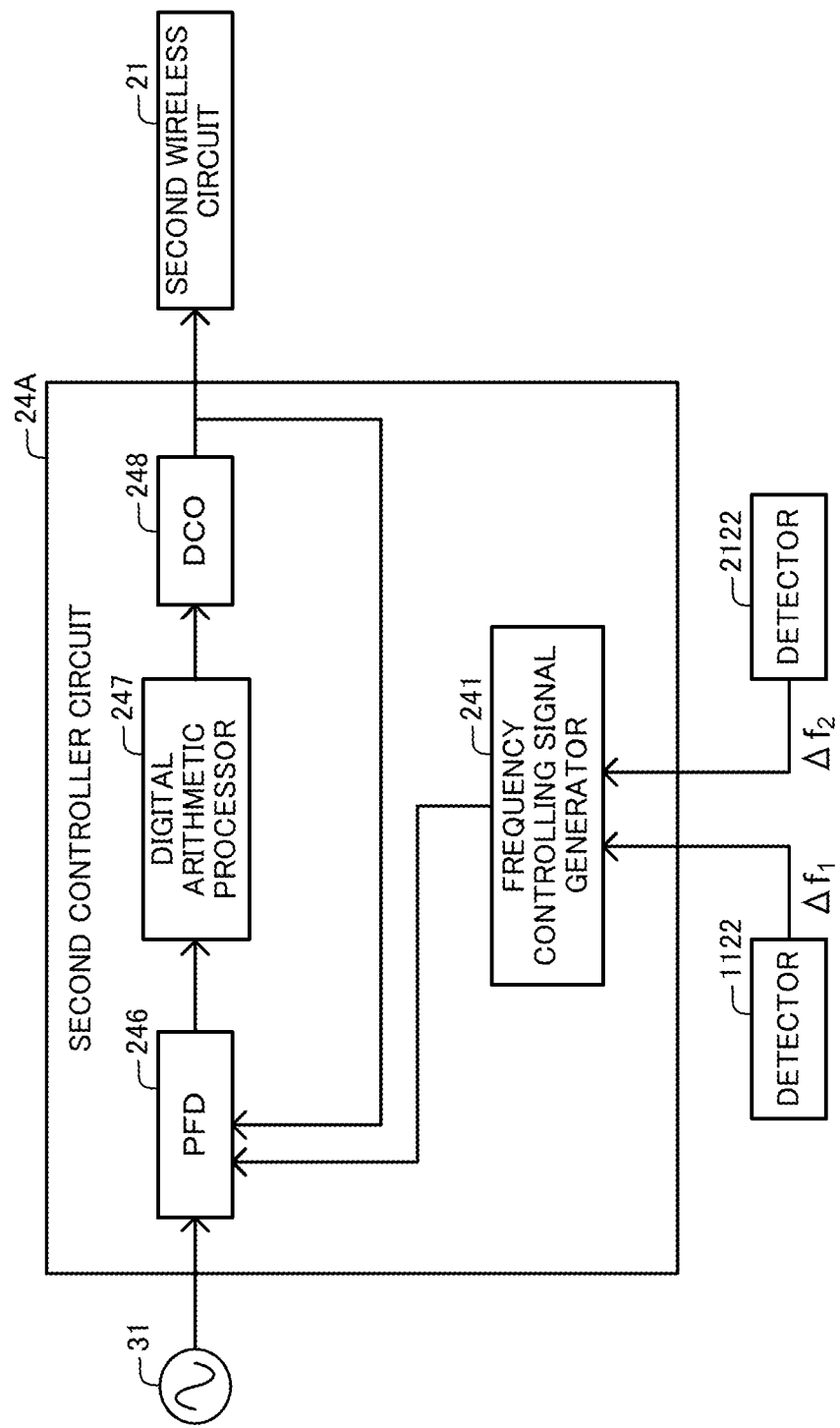
FIG. 9 is a block diagram schematically illustrating an example of the configuration of a second controller circuit according to a first modification to the first embodiment.

As illustrated in FIG. 9, the wireless device 1 according to the first modification to the first embodiment exemplarily includes a second controller circuit 24A in place of the second controller circuit 24 of FIG. 2.

The second controller circuit 24A exemplarily includes a frequency controlling signal generator 241, a Phase Frequency Detector (PFD) 246, a digital arithmetic processor 247, and a (Digitally Controlled Oscillator) DCO 248.

In the second controller circuit 24A, the segment formed of the PFD 246, the digital arithmetic processor 247, and the DCO 248 among the elements of the second controller circuit 24A may be referred to as an ADPLL synthesizer. The segment may be achieved by a Complementary Metal Oxide Semiconductor (CMOS) digital circuit manufactured through the standard CMOS process.

The frequency controlling signal generator 241 in this modification has the same function as that of the frequency controlling signal generator 241 of FIG. 7.

The PFD 246 outputs a phase difference signal corresponding to the phase difference between the divided signal and the clock signal output from the oscillator circuit 31. In this modification, the divided signal has a frequency $F_M (=F_2/M)$ obtained by dividing the frequency $F_2$ of a clock signal output from the DCO 248 by the division ratio M represented by the frequency controlling signal output from the frequency controlling signal generator 241.

The PFD 246 of this modification includes a Time to Digital Converter (TDC) and a counter. The PFD 246 detects the integer part of a ratio of the frequency of the clock signal output from the oscillator circuit 31 to that of the divided signal by using the counter, and further detects the decimal part of the ratio by using the TDC.

The PFD 246 outputs a phase difference signal based on the result of detection by the counter and the TDC. In this modification, if the divided signal is advanced over the clock signal output from the oscillator circuit 31, the phase difference signal has a value to decrease the frequency of the clock signal to be generated by the DCO 248. In contrast, if the divided signals delayed compared with the clock signal output from the oscillator circuit 31, the phase difference signal has a value to increase the frequency of the clock signal to be generated by the DCO 248.

The digital arithmetic processor 247 smooths the phase difference signal and includes a low-pass filter in this modification. The digital arithmetic processor 247 outputs a frequency controlling signal representing a frequency corresponding to the smoothed phase difference signal.

The DCO 248 includes an oscillator that can generate a signal having a frequency that the input frequency controlling signal represents. For example, the oscillator may include an LC oscillator circuit. In this modification, the DCO 248 generates a clock signal having a frequency represented by the frequency controlling signal output from the digital arithmetic processor 247, and then outputs the generated clock signal to the second wireless circuit 21.

The second controller circuit 24A corrects the frequency of a clock signal output from the oscillator circuit 31 in the above manner and then supplies the corrected clock signal to the second wireless circuit 21. Consequently, the second controller circuit 24A controls the second wireless process by correcting the frequency of the clock signal to be supplied to the second wireless circuit 21.

The wireless device 1 of the first modification to the first embodiment functions the same as the wireless device 1 of the first embodiment. Therefore, the wireless device 1 of the first modification to the first embodiment ensures the same advantages and effects as those of the first embodiment.

<Second Modification to the First Embodiment>

Next, description will now be made in relation to a wireless device according to a second modification to the first embodiment. The wireless device according to the second modification to the first embodiment is different from the wireless device 1 of the first embodiment in the point that the frequency of the clock signal output from the oscillator circuit is corrected for the second frequency band in parallel with the correction for the first frequency band. Hereinafter, the description will mainly focus on the difference. In this modification, like reference numbers designate the same or the substantially same elements and parts of the first embodiment.

(Configuration)

Figure 10:
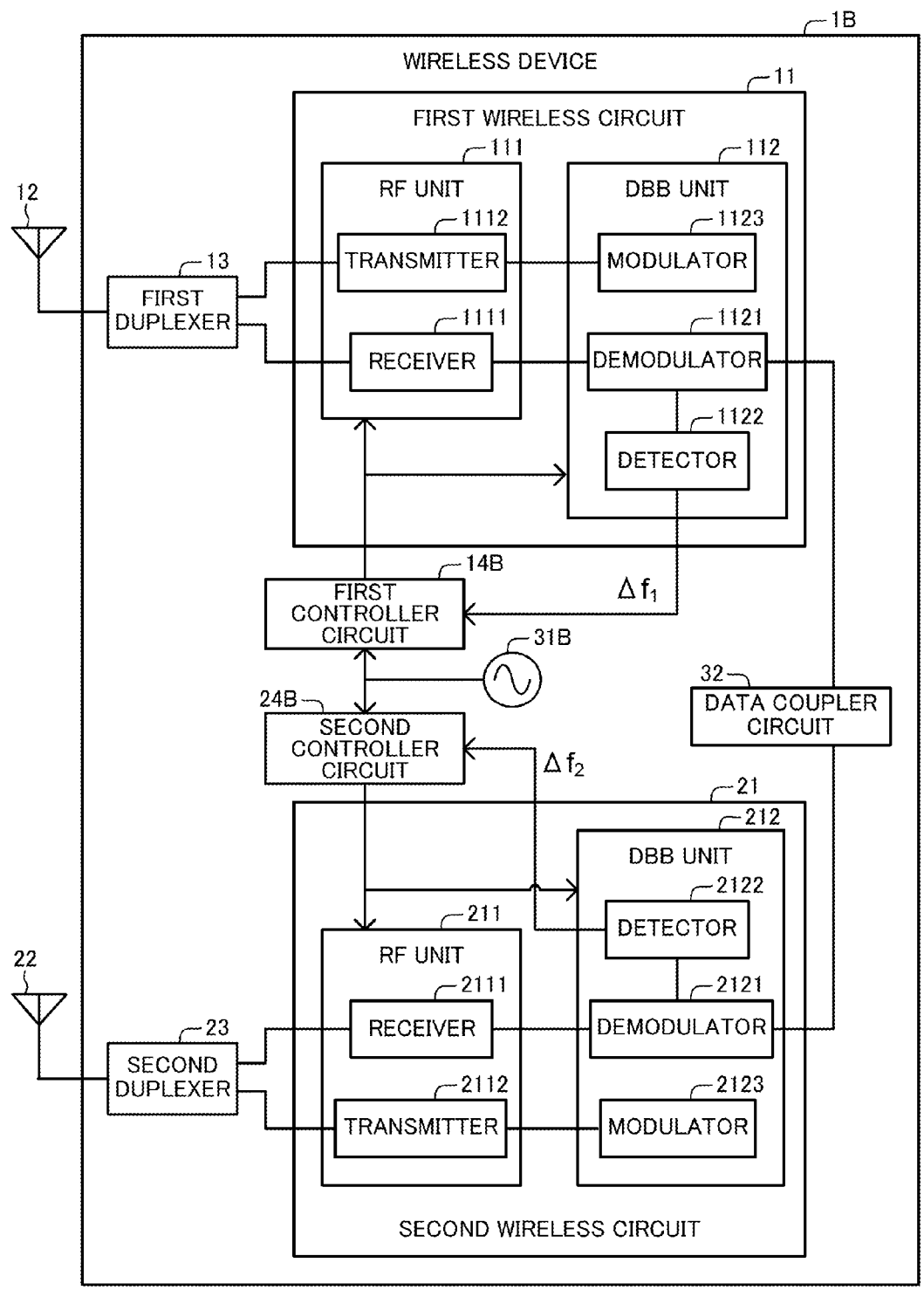
FIG. 10 is a block diagram schematically illustrating an example of the configuration of a wireless device according to a second modification to the first embodiment.

As illustrated in FIG. 10, the wireless device 1B according to the second modification to the first embodiment exemplarily includes a first controller circuit 14B, a second controller circuit 24B, and an oscillator circuit 31B in place of the first controller circuit 14, the second controller circuit 24, and the oscillator circuit 31 of FIG. 2, respectively.

The oscillator circuit 31B generates a clock signal having a certain frequency. The oscillator circuit 31B includes a quartz oscillator. An example of the oscillator is a TCXO or a VC-TCXO.

The second controller circuit 24B is different from the second controller circuit 24 of FIG. 2 in the point that the second controller circuit 24B corrects the frequency of the clock signal output from the oscillator circuit 31B on the basis of the second phase difference $\Delta f_2$ regardless of the first phase difference $\Delta f_1$.

Figure 11:
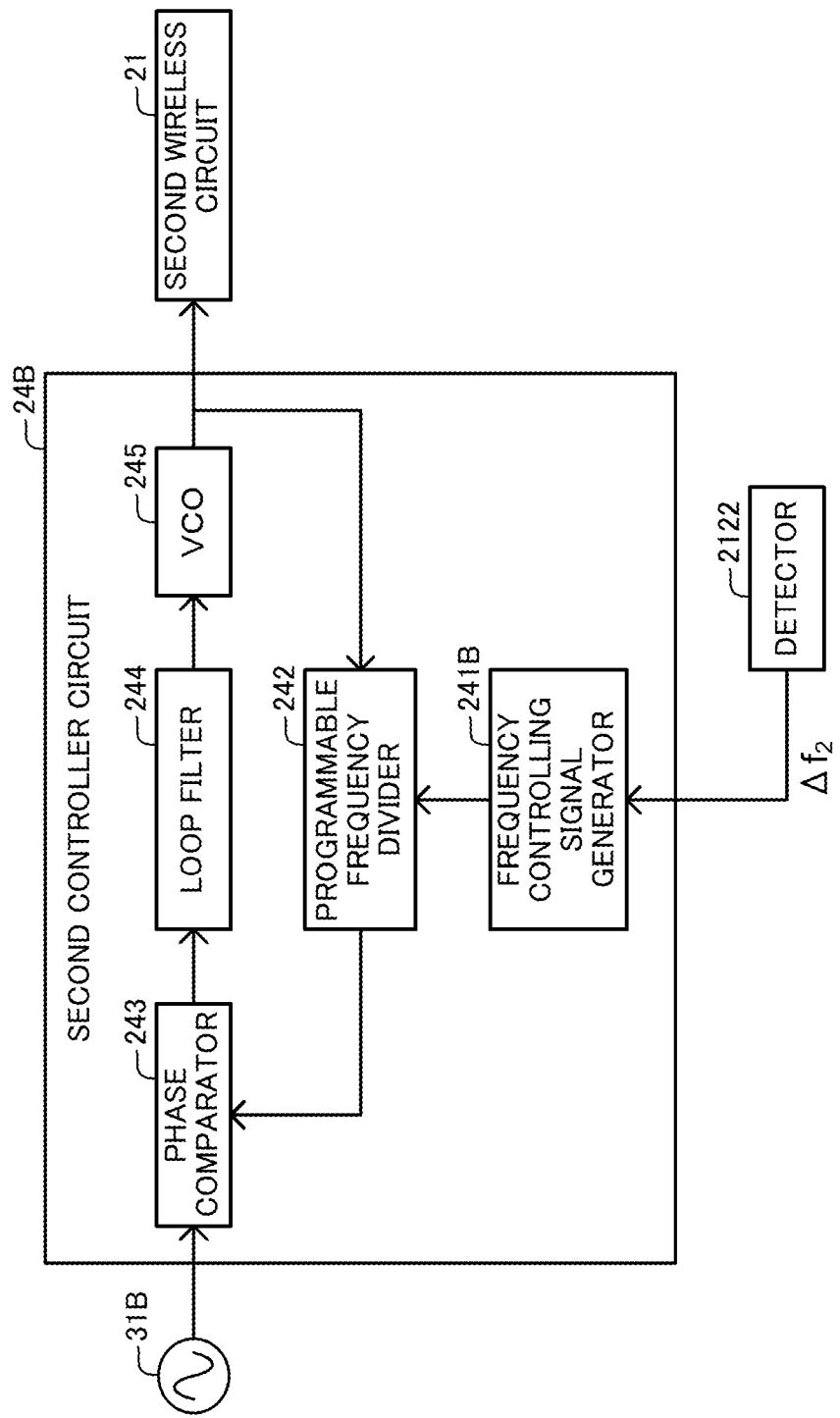
FIG. 11 is a block diagram schematically illustrating an example of the configuration of a second controller circuit of FIG. 10.

As illustrated in FIG. 11, the second controller circuit 24B of this modification includes a frequency controlling signal generator 241B in place of the frequency controlling signal generator 241 of FIG. 7.

The frequency controlling signal generator 241B determines a division ratio M based on the second phase difference $\Delta f_2$ detected by the detector 2122 and outputs a frequency controlling signal representing the determined division ratio M.

In this modification, the frequency controlling signal generator 241B determines the division ratio M so as to have a larger value as the second phase difference $\Delta f_2$ increases. In this modification, a phase difference having a positive value means that the phase of the received signal is advanced over the corresponding reference phase.

The frequency controlling signal generator 241B may store the relationship between the second phase difference $\Delta f_2$ and the division ratio M beforehand and determine the division ratio M based on the stored relationship and the detected second phase difference $\Delta f_2$.

The second controller circuit 24B corrects the frequency of the clock signal output from the oscillator circuit 31B and supplies the corrected clock signal to the second wireless circuit 21. Consequently, the second controller circuit 24B controls the second wireless process by correcting the frequency of the clock signal to be supplied to the second wireless circuit 21.

The first controller circuit 14B has the same function as that of the second controller circuit 24B except for the point that the first controller circuit 14B uses the first phase difference $\Delta f_1$ in place of the second phase difference $\Delta f_2$ and supplies the clock signal to the first wireless circuit 11 in place of the second wireless circuit 21.

Accordingly, the first controller circuit 14B corrects the frequency of the clock signal output from the oscillator circuit 31B and supplies the corrected clock signal to the first wireless circuit 11. Consequently, the first controller circuit 14B controls the first wireless process by correcting the frequency of the clock signal to be supplied to the first wireless circuit 11.

The first controller circuit 14B and the second controller circuit 24B may each include an ADPLL synthesizer in place of the digital PLL synthesizer.

(Operation)

Description will now be made in relation to an example of the operation of the wireless device 1B with reference to FIGS. 10 and 12.

In the first wireless circuit 11, the receiver 1111 receives, through the first antenna 12, a wireless signal of the first frequency band transmitted from the counterpart wireless device, and then outputs the received wireless signal as the received signal. The detector 1122 detects the first phase difference $\Delta f_1$ representing the difference of the phase of the received signal output from the receiver 1111 from the reference phase of the first frequency band (step S201 of FIG. 12).

In the same manner, the receiver 2111 of the second wireless circuit 21 receives, through the second antenna 22, a wireless signal of the second frequency band transmitted from the counterpart wireless device, and then outputs the received wireless signal as the received signal. The detector 2122 detects the second phase difference $\Delta f_2$ representing the difference of the phase of the received signal output from the receiver 2111 from the reference phase of the second frequency band (step S202 of FIG. 12).

In this modification, a known signal used for detecting the phase differences is received in a time slot common to the first wireless circuit 11 and the second wireless circuit 21 or in different time slots with the first wireless circuit 11 and the second wireless circuit 21.

Figure 12:
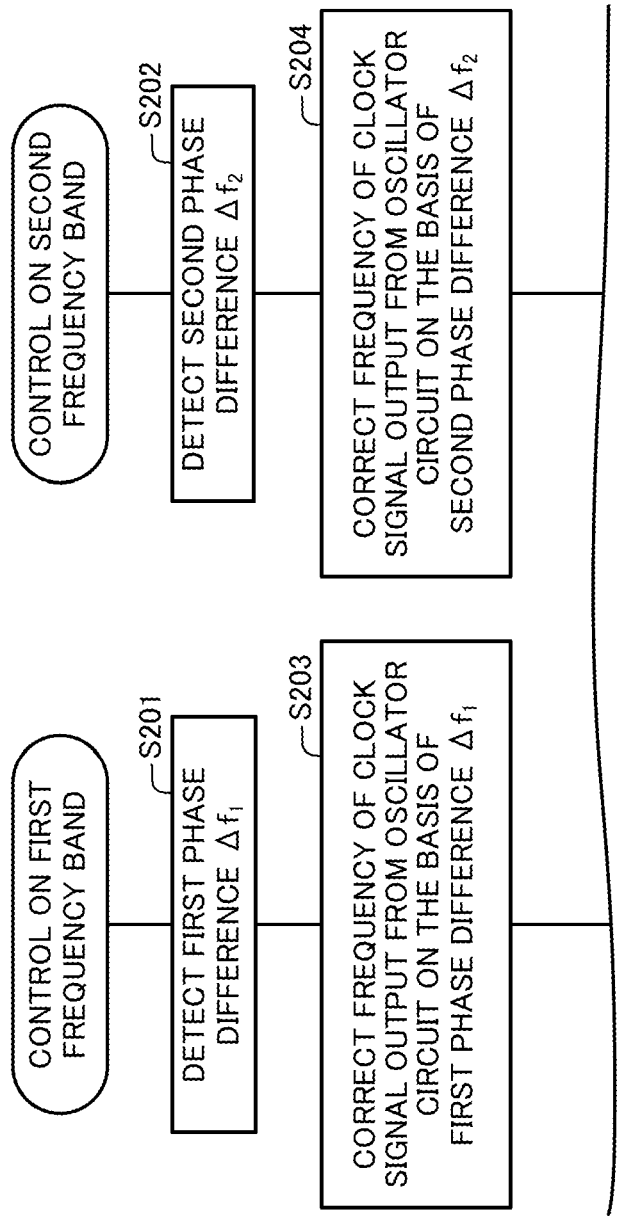
FIG. 12 is a sequential diagram illustrating an example of a succession of procedural steps performed by a wireless device of FIG. 10.

The first controller circuit 14B corrects the frequency of the clock signal output from the oscillator circuit 31B on the basis of the first phase difference $\Delta f_1$ detected by the detector 1122 (step S203 of FIG. 12). Then the first controller circuit 14B supplies the corrected clock signal to the first wireless circuit 11. As the above, the first controller circuit 14B controls the first wireless process by correcting the frequency of the clock signal to be supplied to the first wireless circuit 11.

Similarly, the second controller circuit 24B corrects the frequency of the clock signal output from the oscillator circuit 31B on the basis of the second phase difference $\Delta f_2$ detected by the detector 2122 (step S204 of FIG. 12). Then the second controller circuit 24B supplies the corrected clock signal to the second wireless circuit 21. As the above, the second controller circuit 24B controls the second wireless process by correcting the frequency of the clock signal to be supplied to the second wireless circuit 21.

Consequently, the wireless device 1B of the second modification to the first embodiment ensures the same advantages and effects as those of the first embodiment.

Besides, the wireless device 1B of the second modification to the first embodiment can precisely compensate for the respective phase differences of wireless signals for the first and the second frequency bands.

<Second Embodiment>

Next, description will now be made in relation to a wireless device according to a second embodiment. The wireless device of the second embodiment is different from the wireless device of the first embodiment in the point that the second wireless process is controlled by correcting the frequency of a carrier wave signal that the second wireless circuit generates. Hereinafter, the description will mainly focus on the difference.

In this modification, like reference numbers designate the same or the substantially same elements and parts of the first embodiment.

(Configuration)

Figure 13:
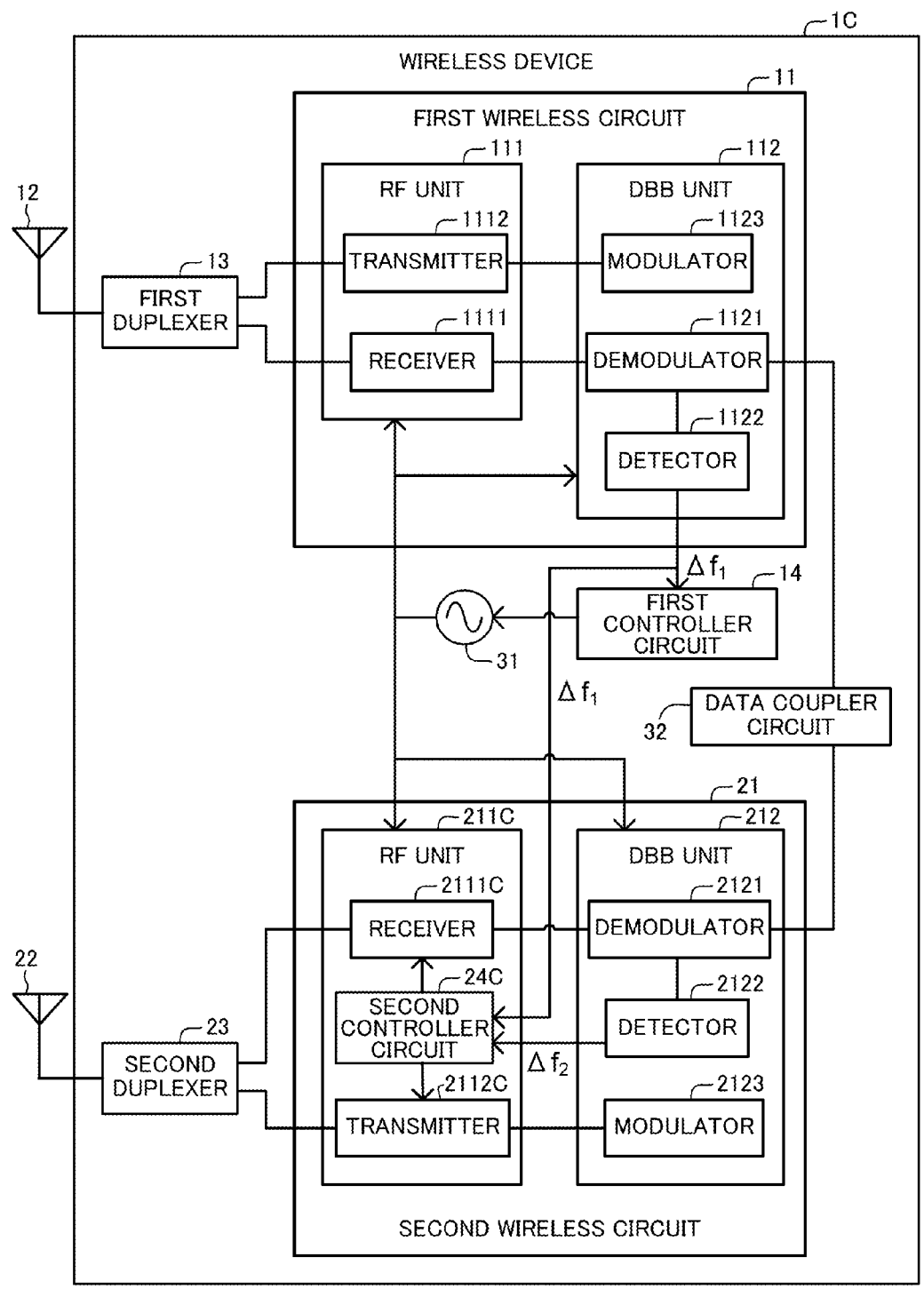
FIG. 13 is a block diagram schematically illustrating an example of the configuration of a wireless device according to a second embodiment.

As illustrated in FIG. 13, a wireless device 1C according to the second embodiment exemplarily includes an RF unit 211C in place of the second controller circuit 24 and the RF unit 211 of FIG. 2. The RF unit 211C exemplarily includes a second controller circuit 24C, a receiver 2111C, and a transmitter 2112C in place of the receiver 2111 and the transmitter 2112 of FIG. 2.

The second wireless circuit 21 of the second embodiment operates in response to the clock signal generated by the oscillator circuit 31.

The second controller circuit 24C determines a division ratio M based on a first phase difference $\Delta f_1$ detected by a detector 1122 and a second phase difference $\Delta f_2$ detected by a detector 2122, and outputs a frequency controlling signal representing the determined division ratio M.

For example, the second controller circuit 24C of this embodiment determines the division ratio M based on the value $\Delta f_2 - \Delta f_1$ calculated by subtracting the first phase difference $\Delta f_1$ from the second phase difference $\Delta f_2$. In this embodiment, a positive phase difference means that the phase of the received signal is advanced over the reference phase. For example, the second controller circuit 24C determines the division ratio M to have a larger value as the value $\Delta f_2 - \Delta f_1$ increases.

The second controller circuit 24C may store the relationship between the value $\Delta f_2 - \Delta f_1$ and the division ratio M and determine the division ratio M based on the stored relationship and the value $\Delta f_2 - \Delta f_1$ calculated from the detected first phase difference $\Delta f_1$ and the detected second phase difference $\Delta f_2$.

The second controller circuit 24C may use the value $\Delta f_2 - k\Delta f_1$ in place of the value $\Delta f_2 - \Delta f_1$ to determine the division ratio M. Here, k represents a certain factor and may be determined on the basis of a frequency of the first frequency band and a frequency of the second frequency band. Alternatively, the factor k may be based on a ratio of the frequency of a carrier wave signal for the first frequency band to the frequency of a carrier wave signal for the second frequency band.

Figure 14:
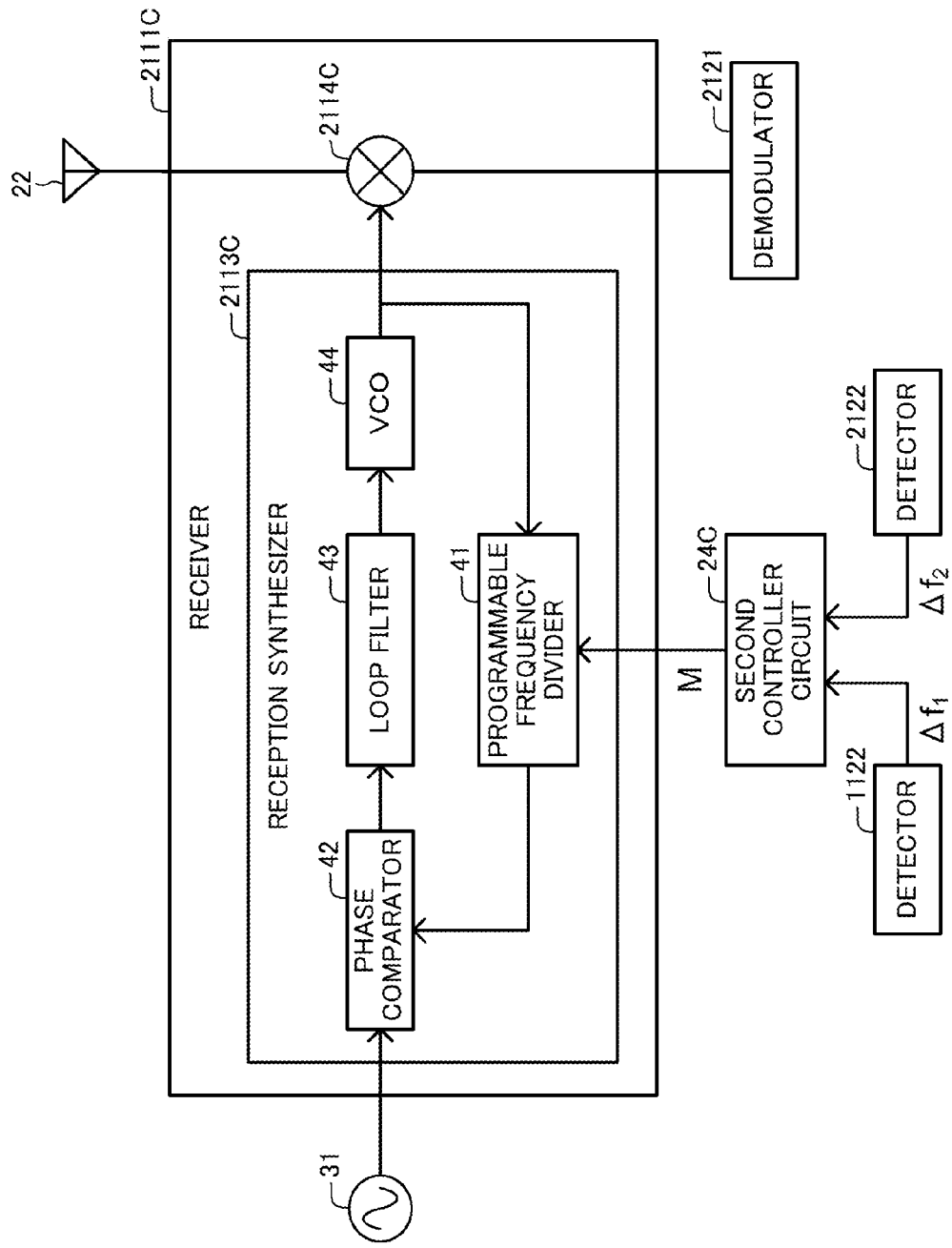
FIG. 14 is a block diagram schematically illustrating an example of the configuration of a receiver of FIG. 13.

As illustrated in FIG. 14, the receiver 2111C exemplarily includes a reception synthesizer 2113C and a multiplier 2114C.

The reception synthesizer 2113C generates a carrier wave signal having a frequency based on the division ratio M represented by the frequency controlling signal output from the second controller circuit 24C using the clock signal generated by the oscillator circuit 31. In this embodiment, the frequency of the carrier wave signal has a value M·F$_2$ obtained by multiplying the frequency F$_2$ of the clock signal generated by the oscillator circuit 31 by the division ratio M.

For example, assuming that the frequency F$_2$ of the clock signal is 1 MHz and the division ratio M is 100, the carrier wave signal has a frequency of 100 MHz. Furthermore, assuming that the frequency F$_2$ of the clock signal is 1 MHz and the division ratio M is 101, the carrier wave signal has a frequency of 101 MHz. As the above, the minimum value of an amount of correcting the frequency of the carrier wave signal is the frequency F$_2$ of the clock signal in this embodiment.

In this embodiment, the frequency of the carrier wave signal generated by the reception synthesizer 2113C is included in the second frequency band.

The reception synthesizer 2113C exemplarily includes a programmable frequency divider 41, a phase comparator 42, a loop filter 43, and a VCO 44. The reception synthesizer 2113C may be also referred to as a digital PLL synthesizer. The programmable frequency divider 41, the phase comparator 42, the loop filter 43, and the VCO 44 have the same functions as the programmable frequency divider 242, the phase comparator 243, the loop filter 244, and the VCO 245 of FIG. 7, respectively.

As the above, the second controller circuit 24C corrects the frequency of the carrier wave signal generated by the reception synthesizer 2113C on the basis of the first phase difference $\Delta f_1$ and the second phase difference $\Delta f_2$, so that the second controller circuit 24C controls the second wireless process.

The multiplier 2114C multiplies the wireless signal received through the second antenna 22 by the carrier wave signal generated by the reception synthesizer 2113C. The multiplier 2114C outputs the multiplied signal to the demodulator 2121. The signal output from the multiplier 2114C can also be referred to as the received signal.

Figure 15:
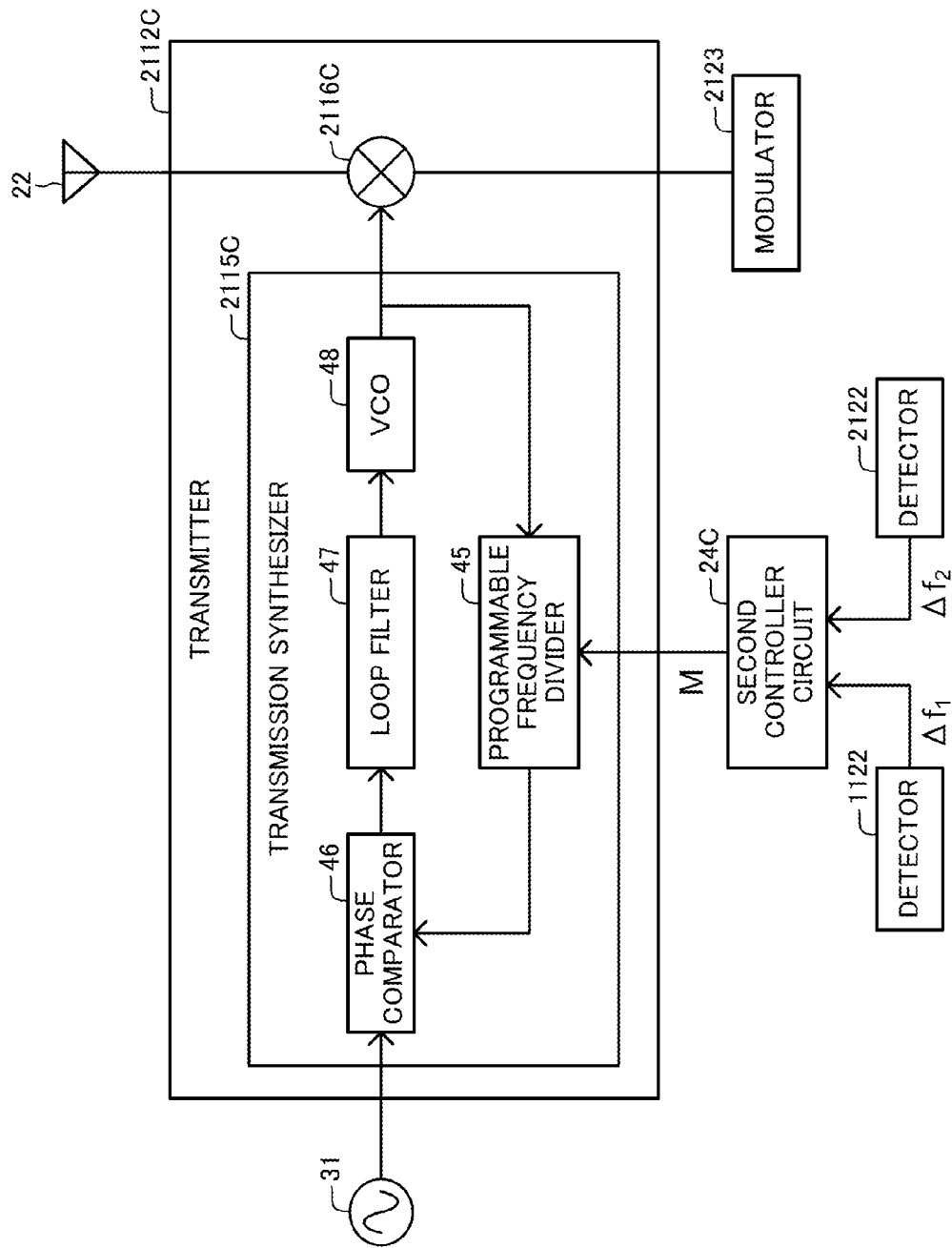
FIG. 15 is a block diagram schematically illustrating an example of the configuration of a transmitter of FIG. 13.

As illustrated in FIG. 15, the transmitter 2112C exemplarily includes the transmission synthesizer 2115C and the multiplier 2116C.

Likewise the reception synthesizer 2113C, the transmission synthesizer 2115C generates a carrier wave signal having a frequency based on the division ratio M represented by the frequency controlling signal output from the second controller circuit 24C using the clock signal generated by the oscillator circuit 31. In this embodiment, the transmission synthesizer 2115C generates the carrier wave signal having the same frequency as that of the carrier wave signal that the reception synthesizer 2113C generates.

The transmission synthesizer 2115C exemplarily includes a programmable frequency divider 45, a phase comparator 46, a loop filter 47, and a VCO 48 likewise the reception synthesizer 2113C.

The multiplier 2116C multiples the transmission signal output from the modulator 2123 by the carrier wave signal generated by the transmission synthesizer 2115C. The multiplier 2116C outputs the multiplied signal to the second antenna 22 through the second duplexer 23.

As the above, the second controller circuit 24C corrects the frequency of the carrier wave signal generated by the transmission synthesizer 2115C on the basis of the first phase difference $\Delta f_1$ and the second phase difference $\Delta f_2$. Thereby, the second controller circuit 24C controls the second wireless process.

The reception synthesizer 2113C and the transmission synthesizer 2115C may each be an ADPLL synthesizer.

(Operation)

Figure 16:
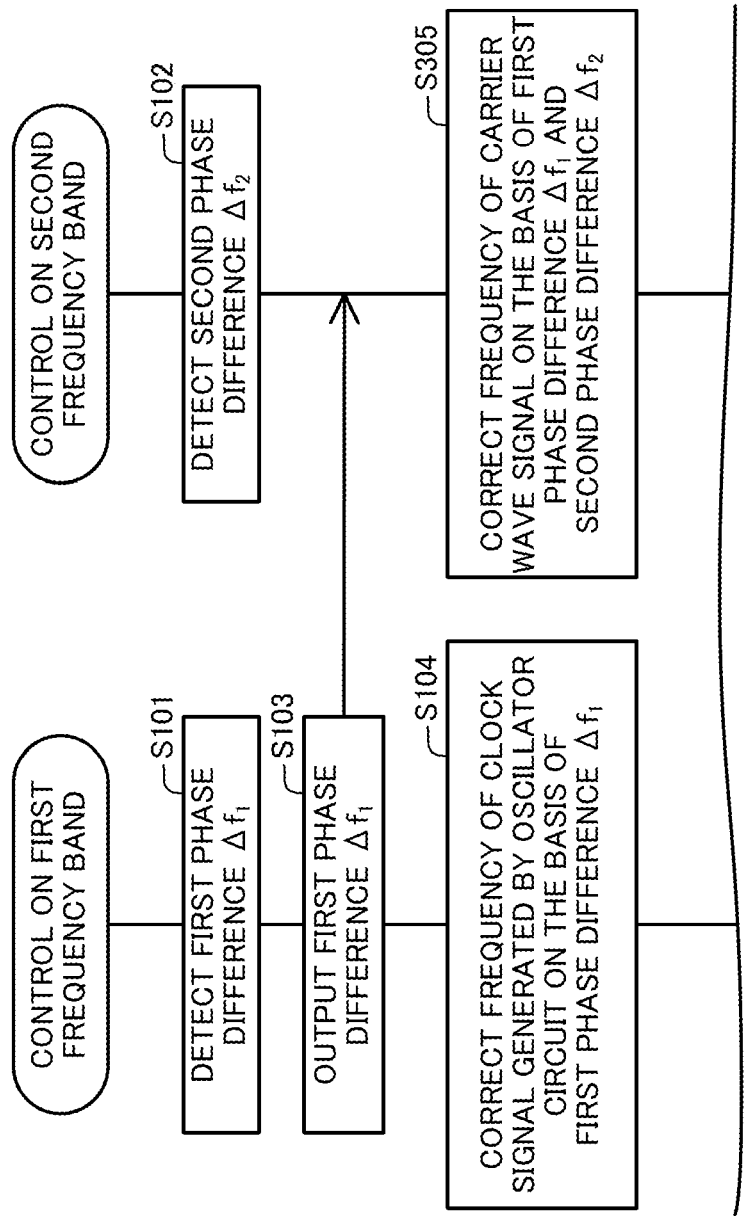
FIG. 16 is a sequential diagram illustrating a succession of procedural steps performed by a wireless device of FIG. 13.

Description will now be in relation to the operation of the wireless device 1C with reference to FIGS. 13 and 16.

The wireless device 1C operates the same as steps S101-S104 of FIG. 8 (steps S101-S104 of FIG. 16).

The second controller circuit 24C corrects the frequency of the carrier wave signal generated by the RF unit 211C on the basis of the first phase difference $\Delta f_1$ detected by the detector 1122 and the second phase difference $\Delta f_2$ detected by the detector 2122 (see step S305 of FIG. 16). For example, step S104 may be carried out in parallel or in substantially parallel with step S305 of FIG. 16.

In the above manner, the second controller circuit 24C controls the second wireless process by correcting the frequency of the carrier wave signal generated by the second wireless circuit 21.

The wireless device 1C of the second embodiment ensures the same advantages and effects as those of the first embodiment.

Furthermore, the first controller circuit of the wireless device 1C of the second embodiment controls the first wireless process by correcting the frequency of the clock signal to be supplied to the first wireless circuit 11 while the second controller circuit 24C controls the second wireless process by correcting the frequency of the carrier wave signal to be generated by the second wireless circuit 21.

This can precisely compensate for the phase differences of the received wireless signals of the first and the second frequency bands.

Furthermore, the first controller circuit of the wireless device 1C of the second embodiment controls the oscillator circuit 31 so as to correct the frequency of the clock signal to be generated by the oscillator circuit 31 on the basis of the first phase difference $\Delta f_1$ of the first frequency band. In contrast, the second controller circuit 24C controls the second wireless circuit 21 so as to correct the frequency of the carrier wave signal to be generated by the second wireless circuit 21 on the basis of the first phase difference $\Delta f_1$ of the first frequency band and the second phase difference $\Delta f_2$ of the second frequency band.

This corrects the frequency of the clock signal to be generated by the oscillator circuit 31 on the basis of the first phase difference $\Delta f_1$ of the first frequency band, so that the phase difference of the received wireless signal of the first frequency band can be compensated. The frequency of the carrier wave signal generated by the second wireless circuit 21 is corrected on the basis of the first phase difference $\Delta f_1$ of the first frequency band and the second phase difference $\Delta f_2$ of the second frequency band, so that both the first phase difference $\Delta f_1$ of the first frequency band and the second phase difference $\Delta f_2$ of the second frequency band can be reflected in the frequency of the carrier wave signal to be generated by the second wireless circuit 21. Consequently, the phase difference of the received wireless signal of the second frequency band can be compensated.

The second controller circuit 24C may correct the frequency of one of the carrier wave signals generated by the reception synthesizer 2113C and the transmission synthesizer 2115C, not correcting the frequency of the other carrier wave signal.

<First Modification to the Second Embodiment>

Next, description will now be made in relation to a wireless device according to a first modification to the second embodiment. The wireless device of the first modification to the second embodiment is different from that of the second embodiment in the point that the wireless device of the first modification includes two programmable frequency dividers in the reception synthesizer. Hereinafter, the description will mainly focus on the difference. In this modification, like reference numbers designate the same or the substantially same elements and parts of the second embodiment.

Figure 17:
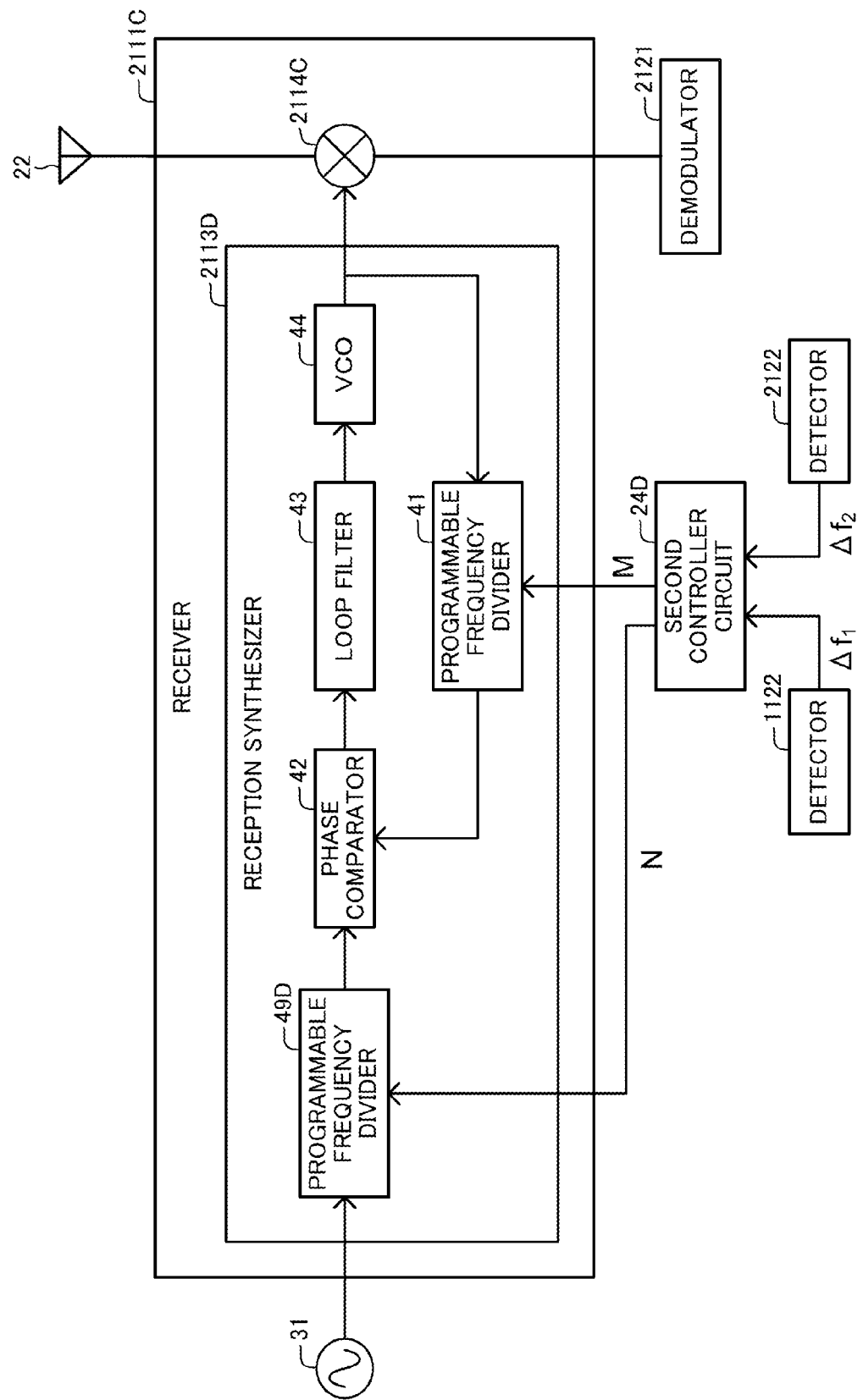
FIG. 17 is a block diagram schematically illustrating an example of the configuration of a receiver according to a first modification to the second embodiment.

As illustrated in FIG. 17, a reception synthesizer 2113D of the first modification to the second embodiment further includes a programmable frequency divider 49D in addition to the elements included in the reception synthesizer 2113C of FIG. 14.

A second controller circuit 24D of this modification determines a first division ratio M and a second division ratio N on the basis of the first phase difference $\Delta f_1$ and the second phase difference $\Delta f_2$. After the determination, the second controller circuit 24D outputs a frequency controlling signal representing the determined first division ratio M to the programmable frequency divider 41, and outputs a frequency controlling signal representing the determined second division ratio N to the programmable frequency divider 49D. In this modification, the symbol N represents an integer.

With this configuration, the carrier wave signal generated by the reception synthesizer 2113D has a frequency of a value $M \cdot F_2/N$, which is obtained by multiplying the frequency $F_2$ of the clock signal generated by the oscillator circuit 31 by the first division ratio M and then dividing the product $M \cdot F_2$ by the second division ratio N. This can correct the frequency of the carrier wave signal more precisely.

The transmission synthesizer 2115C of FIG. 15 may include two programmable frequency dividers likewise the reception synthesizer 2113D of FIG. 17.

<Second Modification to the Second Embodiment>

Next, description will now be made in relation to a wireless device according to a second modification to the second embodiment. The wireless device of the second modification to the second embodiment is different from that of the first modification to the second embodiment in the point that a reception synthesizer of the second modification includes a prescaler. Hereinafter, the description will mainly focus on the difference. In this modification, like reference numbers designate the same or the substantially same elements and parts of the first modification to the second embodiment.

Figure 18:
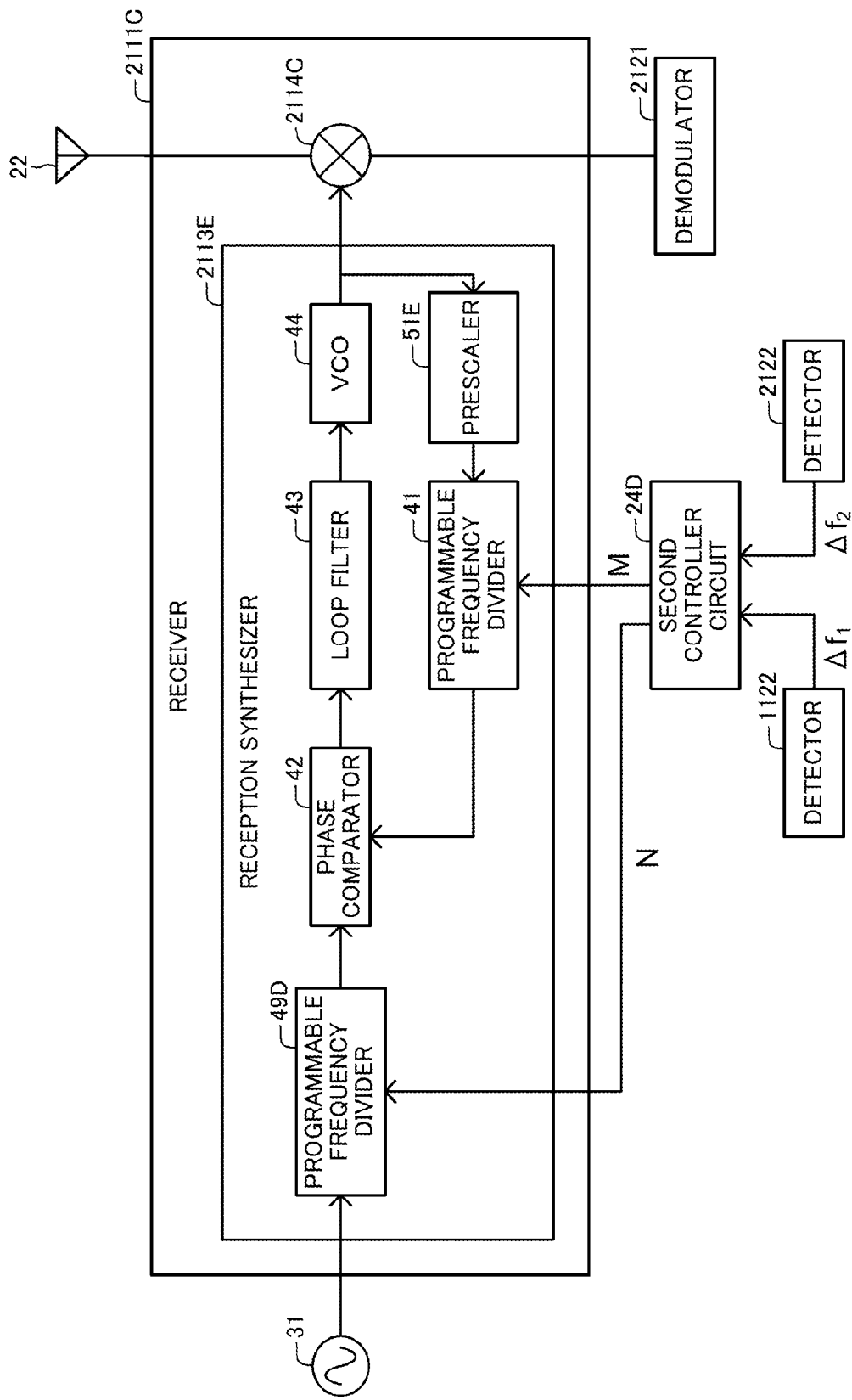
FIG. 18 is a block diagram schematically illustrating an example of the configuration of a receiver according to a second modification to the second embodiment.

As illustrated in FIG. 18, the reception synthesizer 2113E further includes a prescaler 51E in addition to the elements included in the reception synthesizer 2113D of FIG. 17.

The prescaler 51E outputs a divided signal having a frequency $F_2/P$, which is obtained by dividing the frequency $F_2$ of the clock signal output from the VCO 245 by a certain third division ratio P. In this modification, the symbol P represents an integer.

Accordingly, the carrier wave signal generated by the reception synthesizer 2113E has a frequency of $P \cdot M \cdot F_2/N$, which is obtained by multiplying the frequency $F_2$ of the generated clock signal by the third division ratio P and the first division ratio M and then dividing the product $P \cdot M \cdot F_2$ by the second division ratio N. This can correct the frequency of the carrier wave signal more precisely.

The transmission synthesizer 2115C of FIG. 15 may include two programmable frequency dividers and a prescaler likewise the reception synthesizer 2113E of FIG. 18.

<Third Modification to the Second Embodiment>

Next, description will now be made in relation to a wireless device according to a third modification to the second embodiment. The wireless device of the third modification to the second embodiment is different from that of the second embodiment in the point that the frequencies of the carrier wave signals of the first and the second frequency bands are corrected in parallel with each other. Hereinafter, the description will mainly focus on the difference. In this modification, like reference numbers designate the same or the substantially same elements and parts of the second embodiment.

Figure 19:
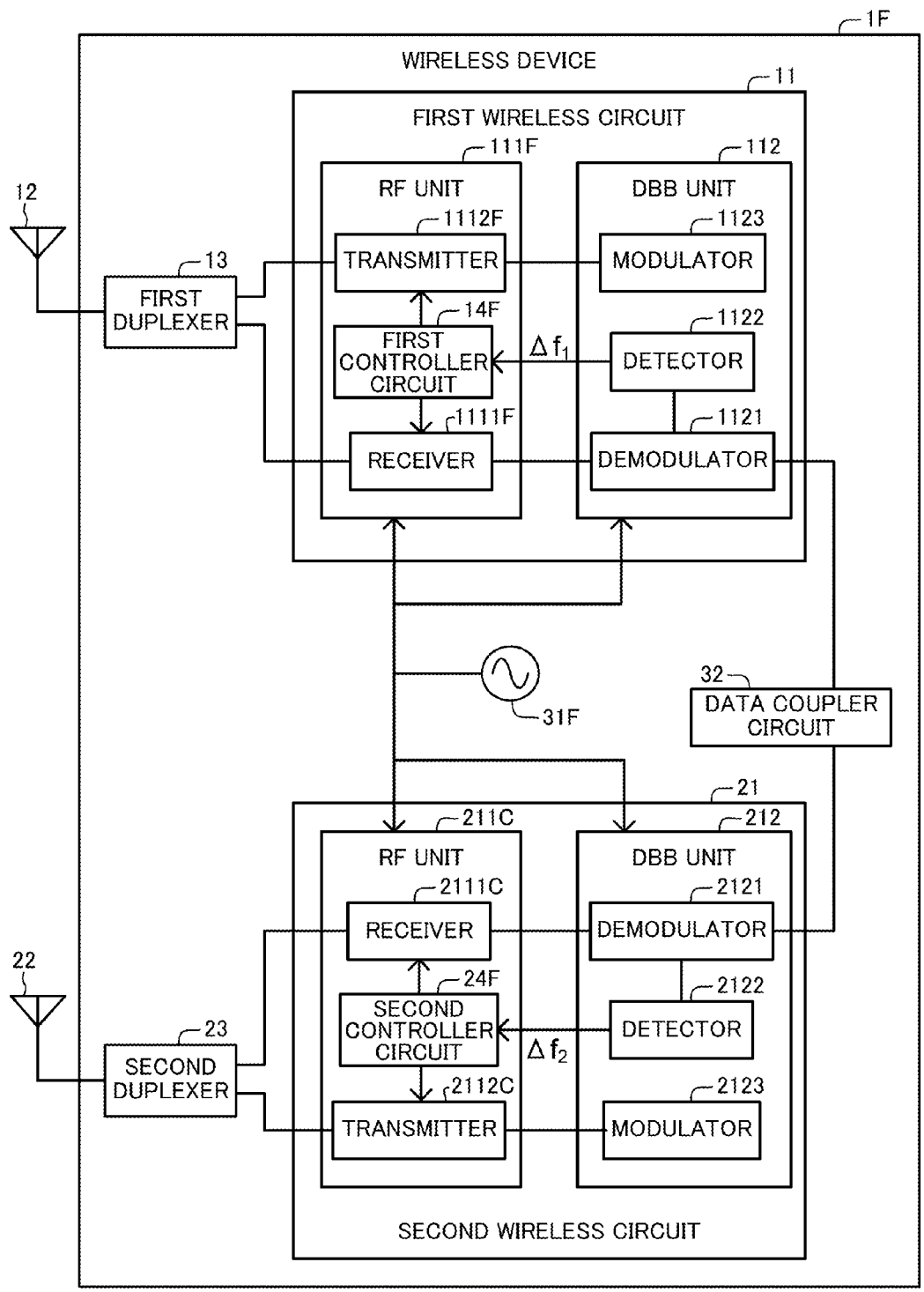
FIG. 19 is a block diagram schematically illustrating an example of the configuration of a wireless device according to a third modification to the second embodiment.

As illustrated in FIG. 19, the wireless device 1F of the third modification to the second embodiment exemplarily includes an RF unit 111F, a second controller circuit 24F, and an oscillator circuit 31F in place of the first controller circuit 14, the RF unit 111, the second controller circuit 24C, and the oscillator circuit 31 of FIG. 13.

The oscillator circuit 31F generates a clock signal having a certain frequency. In this modification, the oscillator circuit 31F includes a quartz oscillator. An example of the oscillator is a TCXO or a VC-TCXO.

A first wireless circuit 11 of the third modification to the second embodiment operates in response to the clock signal generated by the oscillator circuit 31F.

The RF unit 111F exemplarily includes a first controller circuit 14F, a receiver 1111F, and a transmitter 1112F in place of the receiver 1111 and the transmitter 1112 of FIG. 13.

The first controller circuit 14F determines a division ratio $M_1$ based on the first phase difference $\Delta f_1$ detected by the detector 1122 and outputs a frequency controlling signal representing the determined division ratio M. In this modification, a positive phase difference means that the phase of the received signal is advanced over the corresponding reference phase. For example, the first controller circuit 14F determines the division ratio $M_1$ to have a larger value as the value $\Delta f_1$ increases.

The first controller circuit 14F may store the relationship between the value $\Delta f_1$ and the division ratio $M_1$ beforehand and determine the division ratio $M_1$ based on the stored relationship and the detected first phase difference $\Delta f_1$.

The receiver 1111F includes a reception synthesizer and a multiplier likewise the receiver 2111C of FIG. 14 and has the same function as that of the receiver 2111C. The transmitter 1112F includes a transmission synthesizer and a multiplier likewise the transmitter 2112C of FIG. 15 and has the same function as that of the transmitter 2112C.

The second controller circuit 24F determines a division ratio $M_2$ based on the second phase difference $\Delta f_2$ detected by the detector 2122 and outputs a frequency controlling signal representing the determined division ratio $M_2$. For example, the second controller circuit 24F determines the division ratio $M_2$ to have a larger value as the value $\Delta f_2$ increases.

The second controller circuit 24F may store the relationship between the value $\Delta f_2$ and the division ratio $M_2$ beforehand and determine the division ratio $M_2$ based on the stored relationship and the detected second phase difference $\Delta f_2$.

(Operation)

Description will now be made in relation to an example of operation of the wireless device 1F with reference to FIGS. 19 and 20.

Figure 20:
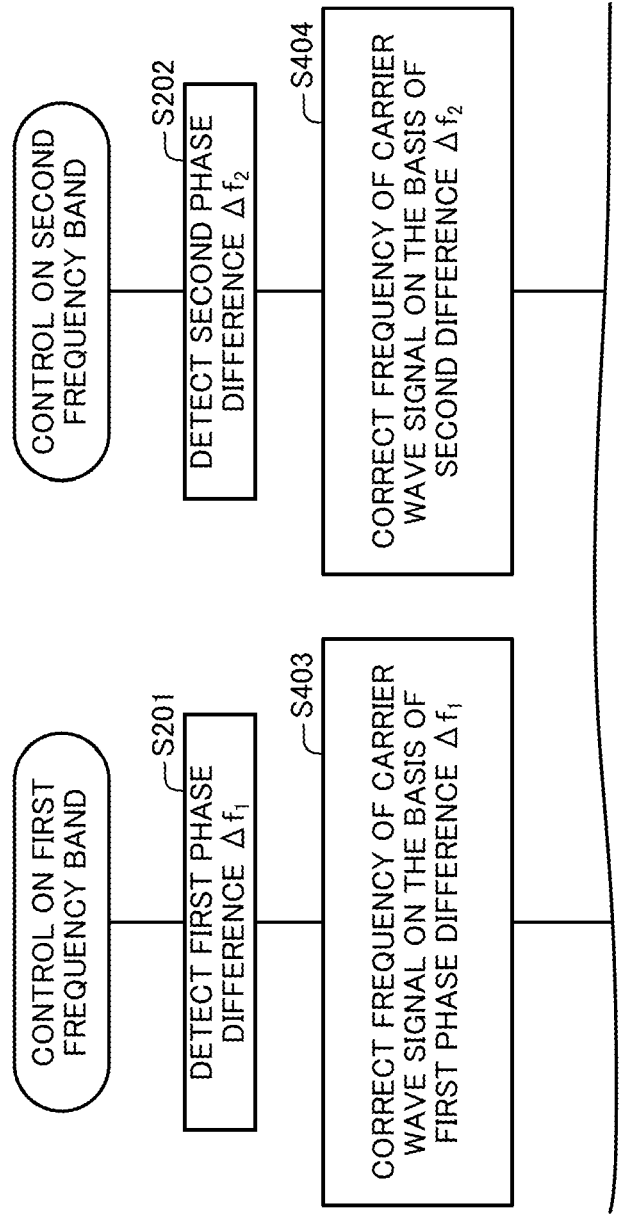
FIG. 20 is a sequential diagram illustrating a succession of procedural steps performed by a wireless device of FIG. 19.

The wireless device 1F operates the same as steps S201-S202 of FIG. 12 (steps 5201 and 5202 of FIG. 20).

The first controller circuit 14F corrects the frequency of the carrier wave signal to be generated by the RF unit 111F on the basis of the first phase difference $\Delta f_1$ detected by the detector 1122 (step S403 of FIG. 20). In this manner, the first controller circuit 14F controls the first wireless process by correcting the frequency of the carrier wave signal to be generated by the first wireless circuit 11.

Likewise, the second controller circuit 24F corrects the frequency of the carrier wave signal to be generated by the RF unit 211C on the basis of the second phase difference $\Delta f_2$ detected by the detector 2122 (step S404 of FIG. 20). In this manner, the second controller circuit 24F controls the second wireless process by correcting the frequency of the carrier wave signal to be generated by the second wireless circuit 21.

Therefore, the wireless device 1F of the third modification to the second embodiment ensures the same advantages and effects as those of the wireless device 1C of the second embodiment.

Furthermore, the wireless device 1F of the third modification to the second embodiment can precisely compensate for the phase differences of the received wireless signals of the first and the second frequency bands.

<Third Embodiment>

Next, description will now be made in relation to a wireless device according to a third embodiment. The wireless device of the third embodiment is different from that of the first embodiment in the point that the wireless device of the third embodiment controls the second wireless process by correcting the phase of the modulated signal in the second wireless circuit. Hereinafter, the description will mainly focus on the difference. In this embodiment, like reference numbers designate the same or the substantially same elements and parts of the first embodiment.

(Configuration)

Figure 21:
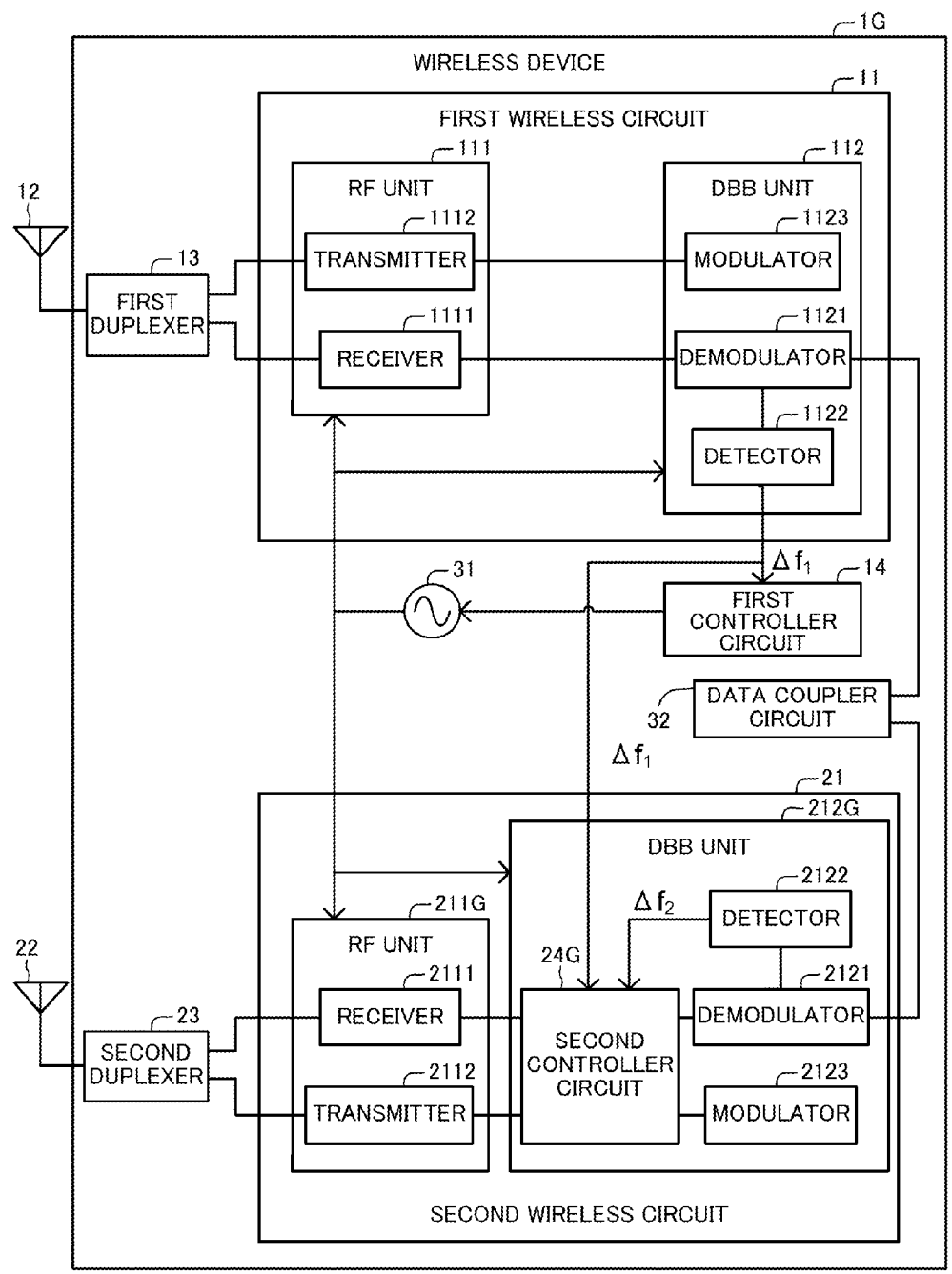
FIG. 21 is a block diagram schematically illustrating an example of the configuration of a wireless device according to a third embodiment.

As illustrated in FIG. 21, a wireless device 1G of the third embodiment exemplarily includes a RF unit 211G and a DBB unit 212G in place of the second controller circuit 24, the RF unit 211, and the DBB unit 212 of FIG. 2.

The second wireless circuit 21 of the third embodiment operates in response to the clock signal generated by the oscillator circuit 31.

The RF unit 211G has the same function as that of the RF unit 211 of FIG. 2 except for the point that the RF unit 211G carries out, at a sampling frequency higher than the frequency of the clock signal synchronized with the demodulating process by the demodulator 2121, AD conversion on the received signal output from the receiver 2111.

In this example, the clock signal synchronized with the demodulating process is also called a Process Synchronized (PS) clock signal. AD conversion performed at a sampling frequency higher than the frequency of the PS clock signal may also be called Over Sampling (OS).

In this embodiment, the received signal after undergoing the AD conversion is also called received data. The received signal after undergoing the AD conversion is a signal before subjected to demodulation, and is therefore also referred to as a modulated signal. The frequency of a clock signal synchronized with the demodulating process is an example of a first frequency while the sampling frequency is an example of the second frequency.

In this embodiment, the sampling frequency has a value of certain factor J times the frequency of the PS clock signal. For example, J represents eight in this embodiment. For example, the frequency of the clock signal synchronized with the demodulating process is a frequency corresponding to the chip rate or the symbol rate. Furthermore, the cycle length of the clock signal synchronized with the demodulating process may be a symbol cycle length.

If the second wireless circuit 21 performs communication complying with the W-CDMA scheme, the chip rate may be 3.84 Mcps. The unit "cps" is an abbreviation for chip per second. In this case, the frequency of the PS clock signal may be 3.84 MHz.

For example, if the second wireless circuit 21 complies with the LTE scheme and uses a frequency band width of 20 MHz for communication, the symbol rate may be 30.72 Msps. The unit "sps" is an abbreviation for symbol per second. In this case, the frequency of the PS clock signal may be 30.72 MHz.

The DBB unit 212G exemplarily includes a second controller circuit 24G in addition to the elements included in the DBB unit 212 of FIG. 2.

Figure 22:
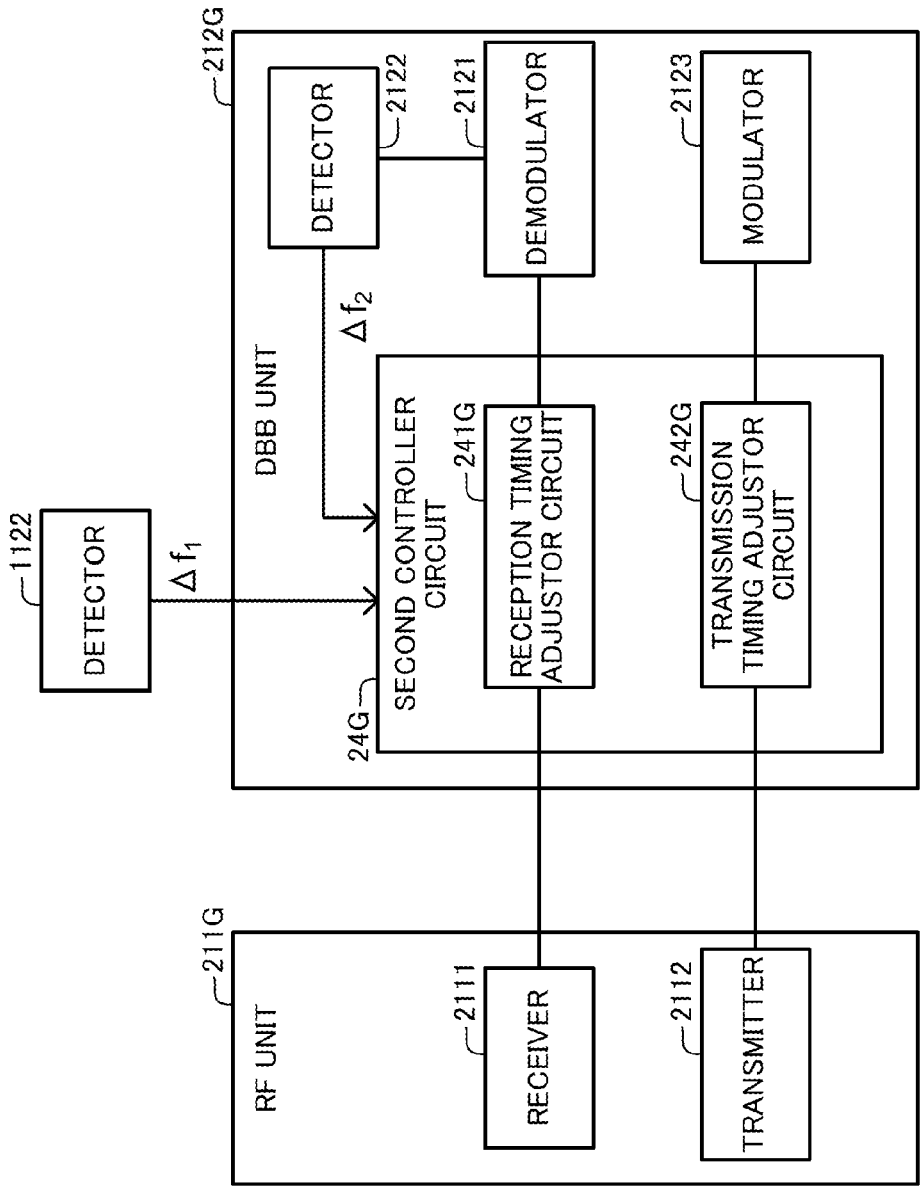
FIG. 22 is a block diagram schematically illustrating an example of the configuration of an RF unit and a DBB unit of FIG. 21.

As illustrated in FIG. 22, the second controller circuit 24G exemplarily includes a reception timing adjustor circuit 241G and a transmission timing adjustor circuit 242G.

Figure 23:
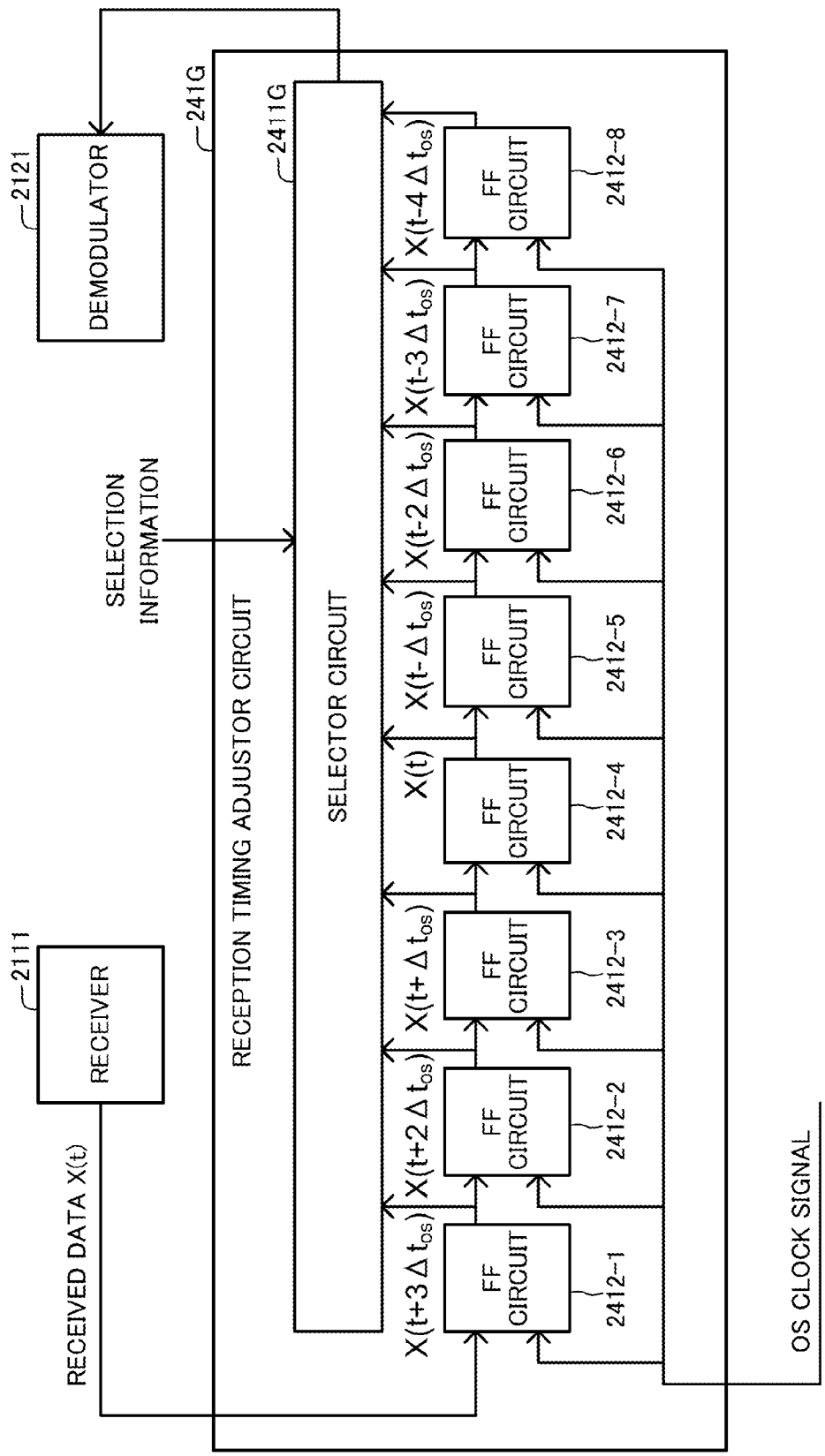
FIG. 23 is a block diagram schematically illustrating an example of the configuration of a reception timing adjustor circuit of FIG. 22.

As illustrated in FIG. 23, the reception timing adjustor circuit 241G exemplarily includes a selector circuit 2411G, J (in this embodiment, eight) Flip Flop (FF) circuits 2412-1 to 2412-J.

The J FF circuits 2412-1 to 2412-J are connected to one another in series. Received data X(t) is input from the receiver 2111 into the FF circuit 2412-1. The symbol X(t) represents received data at the time t. Into each FF circuit 2412-$i$, received data output from the FF circuit 2412-$p$ is input. The symbol i represents an integer of from 2 to J, and p is equal to i−1.

An OS clock signal is input into each FF circuit 2412-$j$. Here, j represents an integer of from 1 to J. The FF circuit 2412-$j$ delays the received data input therein for the cycle length $\Delta t_{os}$ of the input OS clock signal and then outputs the delayed data. In this embodiment, the frequency of the OS clock signal is the same as the sampling frequency.

In this embodiment, the OS clock signal is generated by the second controller circuit 24G. Alternatively, the OS clock signal may be supplied from the RF unit 211G.

In this embodiment, the received data output from the FF circuit 2412-$i$ is delayed for the cycle length of $\Delta t_{os}$ of the OS clock signal as compared with the received data output from the immediately upstream (in this embodiment, toward the FF circuit 2412-1) FF circuit 2412-$p$. Accordingly, the received data output from the FF circuit 2412-$j$ delays longer as the number j increases. In other words, the received data output from the FF circuit 2412-$j$ delays longer as the FF circuit 2412-$j$ is closer to the downstream end (in this embodiment, toward FF circuit 2412-J). The J FF circuits 2412-1 to 2412-J may be collectively called a "shift register".

The second controller circuit 24G generates selection information that specifies one from the J FF circuits 2412-1 to 2412-J on the basis of the first phase difference $\Delta f_1$ detected by the detector 1122 and the second phase difference $\Delta f_2$ detected by the detector 2122.

In this embodiment, the second controller circuit 24G generates the selection information on the basis of the value $\Delta f_2 - \Delta f_1$ obtained by subtracting the first phase difference $\Delta f_1$ from the second phase difference $\Delta f_2$.

In this embodiment, a positive phase difference means that the phase of the received signal is advanced over the reference phase.

In this embodiment, if the absolute value of a value $\Delta f_2 - \Delta f_1$ is equal to or less than a certain threshold, the second controller circuit 24G generates the selection information that specifies the predetermined FF circuit 2412-$j$. The embodiment assumes that the predetermined FF circuit 2412-$j$ is the FF circuit 2412-4 disposed in the middle of the J FF circuits 2412-1 to 2412-J.

Furthermore, if the value $\Delta f_2 - \Delta f_1$ has an absolute value larger than the threshold and is positive, the second controller circuit 24G of this embodiment generates the selection information that specifies more downstream one of the FF circuit 2412-1 to 2412-J as the value $\Delta f_2 - \Delta f_1$ increases. In contrast, if the value $\Delta f_2 - \Delta f_1$ has an absolute value larger than the threshold and is negative, the second controller circuit 24G of this embodiment generates the selection information that specifies more upstream one of the FF circuit 2412-1 to 2412-J as the value $\Delta f_2 - \Delta f_1$ decreases.

The second controller circuit 24G may store the relationship between the value $\Delta f_2 - \Delta f_1$ and the selection information in advance and generate the selection information based on the stored relationship and the value $\Delta f_2 - \Delta f_1$ calculated from the detected first phase difference $\Delta f_1$ and the detected second phase difference $\Delta f_2$.

The second controller circuit 24G may use the value $\Delta f_2 - k\Delta f_1$ in place of the value $\Delta f_2 - \Delta f_1$ to generate the selection information. Here, k represents a certain factor and may be determined on the basis of a frequency of the first frequency band and a frequency of the second frequency band. Alternatively, the factor k may be based on a ratio of the frequency of a carrier wave signal for the first frequency band to the frequency of a carrier wave signal for the second frequency band.

Into the selector circuit 2411G, received data output from each FF circuit 2412-*j* is input. The selector circuit 2411G selects an FF circuit 2412-*j* specified by the selection information generated by the second controller circuit 24G among J FF circuits 2412-1 to 2412-J. The selector circuit 2411G outputs the received data output from the selected FF circuit 2412-*j* to the demodulator 2121.

The selector circuit 2411G selects the FF circuit 2412-*j* and outputs the received data both in synchronization with the PS clock signal. In this embodiment, the PS clock signal is supplied from the demodulator 2121. The PS clock signal may be generated by the second controller circuit 24G.

The demodulator 2121 of the third embodiment generates a PS clock signal and also demodulates the received data output from the reception timing adjustor circuit 241G in synchronization with the generated PS clock signal.

If the absolute value of the value $\Delta f_2 - \Delta f_1$ is larger than the threshold, the second controller circuit 24G changes the phase of the PS clock signal supplied from the demodulator 2121 by an amount corresponding to the generated selection information. If the selection information specifies the FF circuit 2412-*j*, the amount of the changing may be $(j-J/2)\cdot 2\pi/J$.

Figure 24:
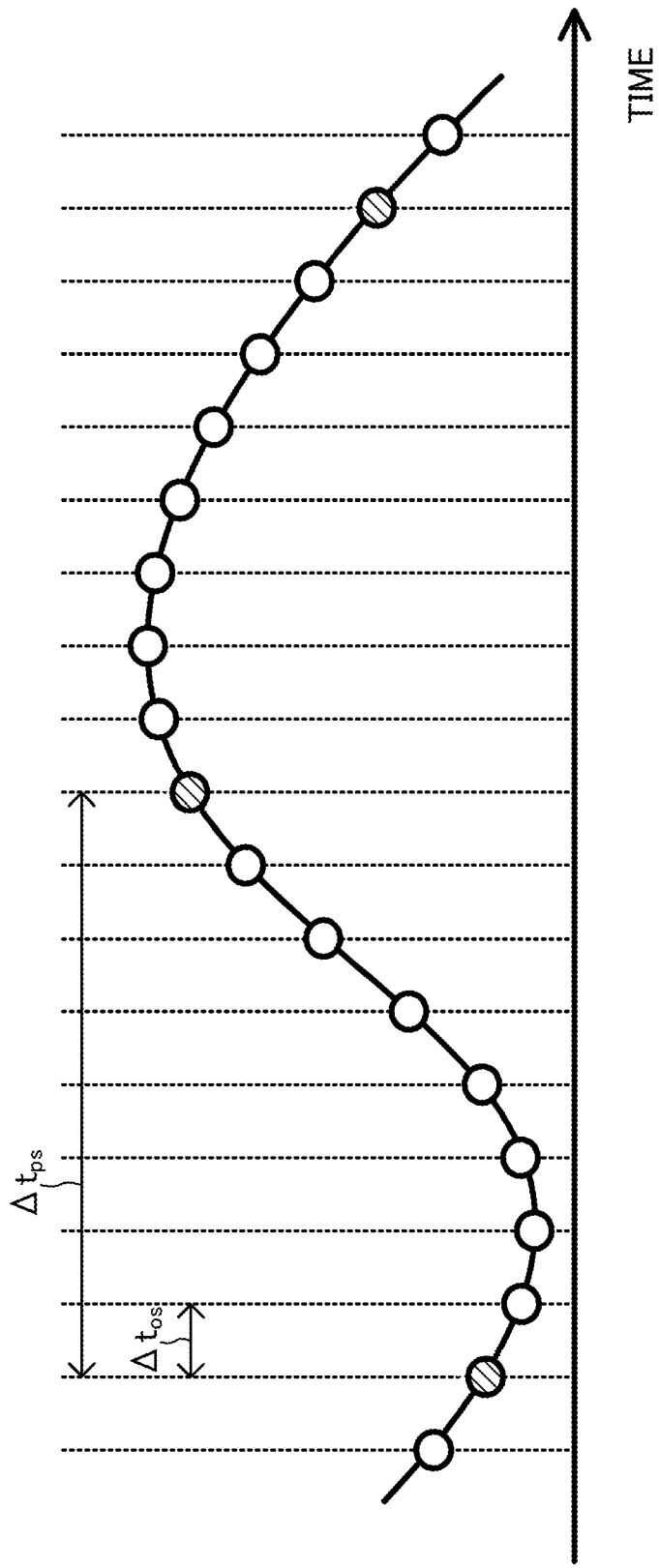
FIG. 24 is a conceptual diagram illustrating an example of relationship between cycle lengths of two clock signals.

As illustrated in FIG. 24, the cycle length $\Delta t_{ps}$ of the PS clock signal is J times (in this embodiment eight times) the cycle length $\Delta t_{os}$ of the OS clock signal.

For example, the following description assumes that the value $\Delta f_2 - \Delta f_1$ keeps a state where the absolute value of the value $\Delta f_2 - \Delta f_1$ is equal to or less than the threshold. Under this state, the reception timing adjustor circuit 241G outputs the received data output from the FF circuit 2412-4 each time the cycle length $\Delta t_{ps}$ of the PS clock signal elapses.

Figure 25:
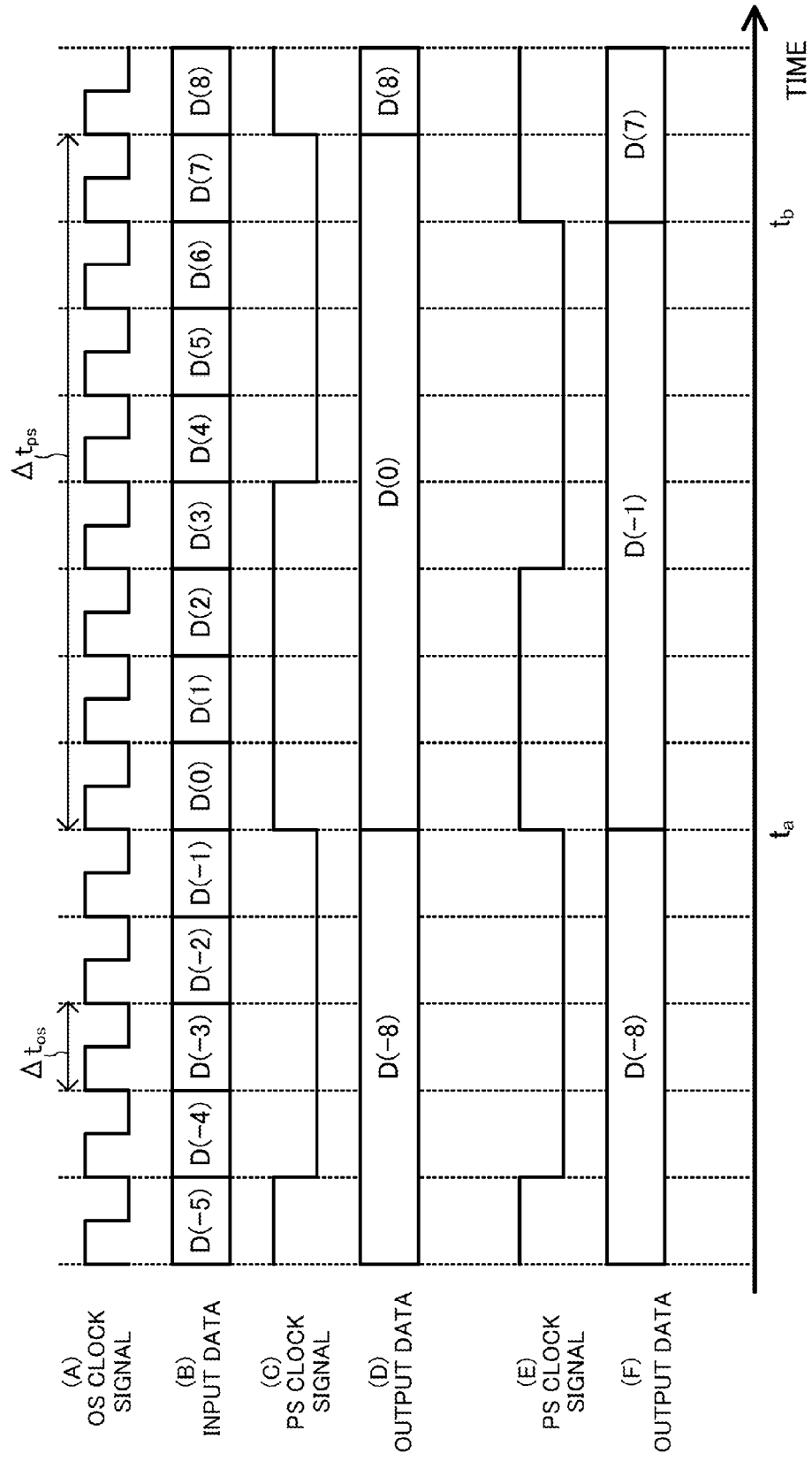
FIG. 25 is a time chart illustrating an example of operation performed by the reception timing adjustor circuit of FIG. 23.

Accordingly, as illustrated in an examples of (A)-(D) of FIG. 25, the reception timing adjustor circuit 241G outputs the pieces D(-8), D(0), and D(8) of received data input at the timing of the cycle length $\Delta t_{ps}$ of the PS clock signal from pieces of received data input.

In FIG. 25, input data represents the received data input into the reception timing adjustor circuit 241G; output data represents the received data output from reception timing adjustor circuit 241G; and D(q) represents a piece of the received data input into the reception timing adjustor circuit 241G at the timing after the time $q\cdot \Delta t_{os}$, which corresponds to q times the cycle length $\Delta t_{os}$ of the OS clock signal, from the time point $t_a$. Here, the symbol q represents an integer.

In this case, the demodulator 2121 demodulates the value at the timing of the cycle length $\Delta t_{ps}$ of the PS clock signal among the received data input into the reception timing adjustor circuit 241G.

Here, the following description assumes that the absolute value of the value $\Delta f_2 - \Delta f_1$ exceeds the threshold at the time point $t_a$ and the second controller circuit 24G generates the selection information that specifies the FF circuit 2412-5. In this case, as illustrated in examples of (E) and (F) of FIG. 25, the reception timing adjustor circuit 241G outputs, at the time point $t_a$, the received data D(-1) output from the FF circuit 2412-5.

Furthermore, the second controller circuit 24G changes the phase of the PS clock signal supplied from the demodulator 2121 by an amount corresponding to the generated selection information. In this embodiment, the amount of the changing is $-2\pi/8$. Consequently, the reception timing adjustor circuit 241G outputs a piece D(7) of the received data. The piece D(7) is input at the time point $t_b$. The time point $t_b$ is after the time period $\Delta t_{ps} - \Delta t_{os}$, which is shorter than the cycle length of the PS clock signal by the cycle length $\Delta t_{os}$ of the OS clock signal, from the time point $t_a$.

Along the above manner, the reception timing adjustor circuit 241G corrects the phase of the modulated signal by changing the timing corresponding to a value to be demodulated by the demodulator 2121 among the received data input therein.

The modulator 2123 of the third embodiment generates the OS clock signal and carries out the modulating process in synchronization with the generated OS clock signal. Consequently, the modulator 2123 outputs a transmission signal containing a value of the timing having a frequency of the OS clock signal, which is higher than the frequency of the clock signal synchronized with the wireless transmitting process carried out by the transmitter 2112. For example, the frequency of the clock signal synchronized with the wireless transmitting process is a frequency corresponding to the chip rate or the symbol rate. For example, the cycle length of the clock signal synchronized with the wireless transmitting process may be a symbol cycle length.

The transmission signal output from the modulator 2123 is also referred to as transmission data and in this embodiment, is referred to as a modulated signal. A clock signal synchronized with a wireless transmitting process is referred to as a PS clock signal, in this embodiment.

In this embodiment, the frequency of the OS clock signal of the modulator 2123 is the same as the sampling frequency of the RF unit 211G. The frequency of the clock signal synchronized with a wireless transmitting process is an example of a first frequency while the frequency of the OS clock signal is an example of the second frequency.

Figure 26:
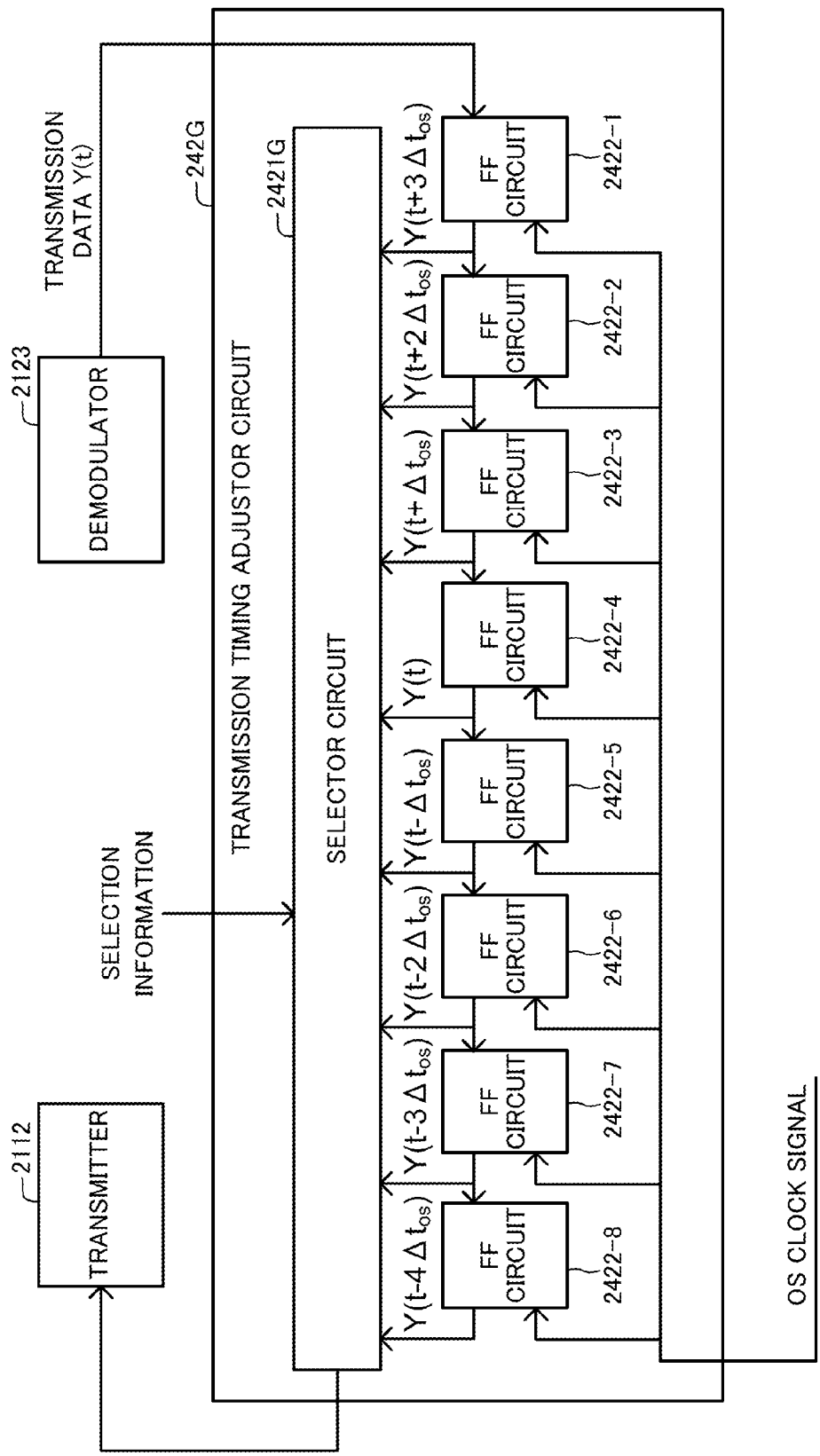
FIG. 26 is a block diagram schematically illustrating an example of the configuration of a transmission timing adjustor circuit of FIG. 22.

As illustrated in FIG. 26, the transmission timing adjustor circuit 242G exemplarily includes a selector circuit 2421G, and J FF circuits 2422-1 to 2422-J.

The transmission timing adjustor circuit 242G operates the same as the reception timing adjustor circuit 241G except for the following first and second differences.

The first difference is that the transmission data Y(t) in place of the received data X(t) is input from the modulator 2123 into the transmission timing adjustor circuit 242G while the second difference is that the transmission timing adjustor circuit 242G outputs the transmission data to the transmitter 2112 in place of the demodulator 2121. Y(t) represents the transmission data at time t.

With this configuration, the transmission timing adjustor circuit 242G corrects the phase of the modulated signal by changing the timing corresponding to a value to be subjected to the wireless transmitting process by the transmitter 2112 among the transmission data input therein.

(Operation)

An example of the operation of the wireless device 1G will now be described by referring to FIGS. 21 and 27.

Figure 27:
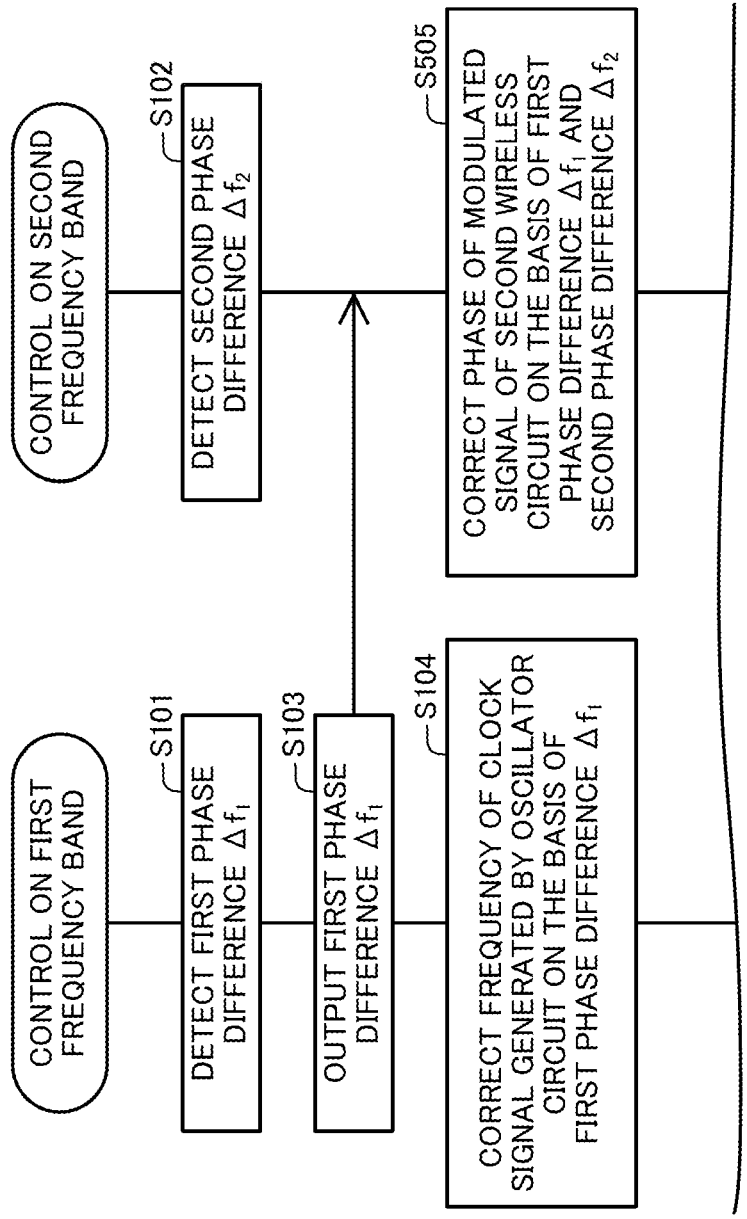
FIG. 27 is a sequential diagram illustrating a succession of procedural steps performed by a wireless device of FIG. 21.

The wireless device 1G operates the same as steps S101 to S104 of FIG. 8 (steps S101 to S104 of FIG. 27).

The second controller circuit 24G corrects the phase of the modulated signal in the second wireless circuit 21 on the basis of the first phase difference $\Delta f_1$ detected by the detector 1122 and the second phase difference $\Delta f_2$ detected by the detector 2122 (step S505 of FIG. 27). For example, steps S104 and S505 of FIG. 27 may be carried out in parallel or in substantially parallel with each other.

The second controller circuit 24G controls the second wireless process by correcting the phase of the modulated signal of the second wireless circuit 21 along the above manner.

As described above, the wireless device 1G of the third embodiment ensures the same advantages and effects as those of the wireless device 1 of the first embodiment.

Furthermore, the first controller circuit of the wireless device 1G of the third embodiment controls the first wireless process by correcting the frequency of the clock signal to be supplied to the first wireless circuit 11. In addition, the second controller circuit 24G controls the second wireless process by correcting the phase of the modulated signal in the second wireless circuit 21.

This can compensate for the phase differences of the received wireless signals of the first and the second frequency bands.

The first controller circuit 14 of the wireless device 1G of the third embodiment controls the oscillator circuit 31 such that the frequency of the clock signal to be generated by the oscillator circuit 31 is corrected on the basis of the first phase difference $\Delta f_1$ of the first frequency band. Besides, the second controller circuit 24G controls the second wireless circuit 21 such that the phase of the modulated signal is corrected on the basis of the first phase difference $\Delta f_1$ of the first frequency band and the second phase difference $\Delta f_2$ of the second frequency band.

Accordingly, the frequency of the clock signal to be generated by the oscillator circuit 31 is corrected on the basis of the first phase difference $\Delta f_1$ of the first frequency band, so that the phase difference of the received wireless signal of the first frequency band can be compensated. Furthermore, the phase of the modulated signal of the second wireless circuit 21 is corrected on the basis of the first phase difference $\Delta f_1$ of the first frequency band and the second phase difference $\Delta f_2$ of the second frequency band. Accordingly, both the first phase difference $\Delta f_1$ of the first frequency band and the second phase difference $\Delta f_2$ of the second frequency band can be reflected in the phase of the modulated signal of the second wireless circuit 21. Consequently, the phase difference of the received wireless signal of the second frequency band can be compensated.

In the wireless device 1G of the third embodiment, the second wireless circuit 21 generates a signal, as the modulated signal, including the value at a timing of the second frequency higher than the first frequency of the clock signal synchronized with both of the wireless transmitting process and the demodulating process. In this embodiment, the first frequency is the frequency of the PS clock signal while the second frequency is the frequency of the OS clock signal.

Furthermore, the second wireless circuit 21 processes the value at a timing of the first frequency among the values contained in the generated modulated signal. Additionally, the second controller circuit 24G corrects the phase of the modulated signal by changing the timing corresponding to the value to be processed by the second wireless circuit 21.

This can precisely compensate for the phase difference of the received wireless signal of the second frequency band.

Alternatively, the second controller circuit 24G may correct the phase of one of the received data and the transmission data, not correcting the phase of the other data.

Figure 28:
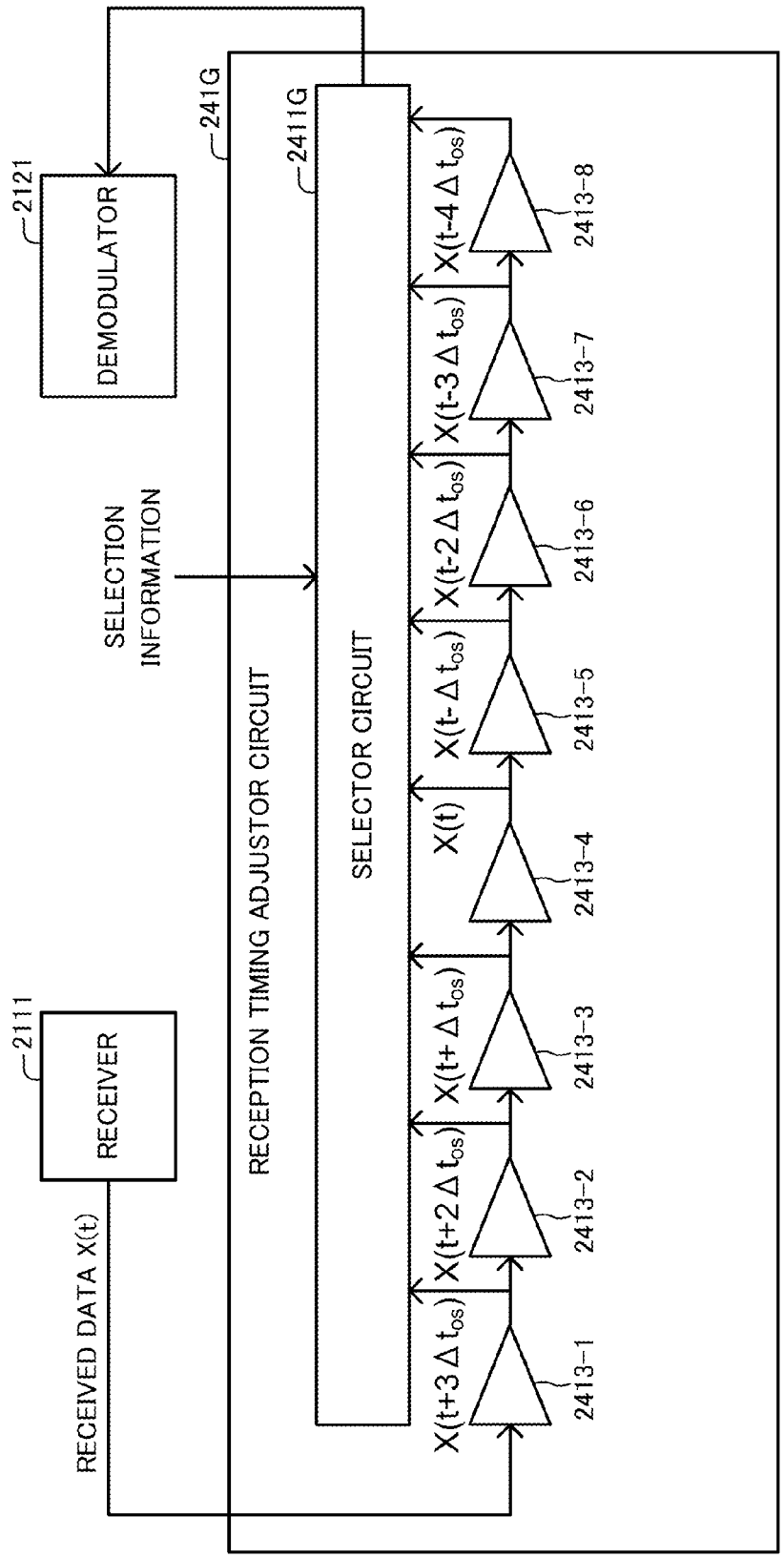
FIG. 28 is a block diagram schematically illustrating a modification to a reception timing adjustor circuit of FIG. 23

Alternatively as illustrated in FIG. 28, the reception timing adjustor circuit 241G may include J delay elements 2413-1 to 2413-J in place of the J FF circuits 2412-1 to 2412-J. Each delay element 2413-j delays the received data input therein for a certain delay time period and then outputs the delayed data. Here, the delay time period is the same as the cycle length $\Delta t_{os}$ of the OS clock signal. Likewise, the transmission timing adjustor circuit 242G may include J delay elements in place of the J FF circuits 2422-1 to 2422-J.

<First Modification to the Third Embodiment>

Next, description will now be made in relation to a wireless device according to a first modification to the third embodiment. The wireless device of the first modification to the third embodiment is different from the wireless device of the third embodiment in the point that the wireless device of this modification corrects the phases of modulated signals of the first and the second frequency bands in parallel with each other. Hereinafter, the description will mainly focus on the difference. In this modification, like reference numbers designate the same or the substantially same elements and parts of the third embodiment.

Figure 29:
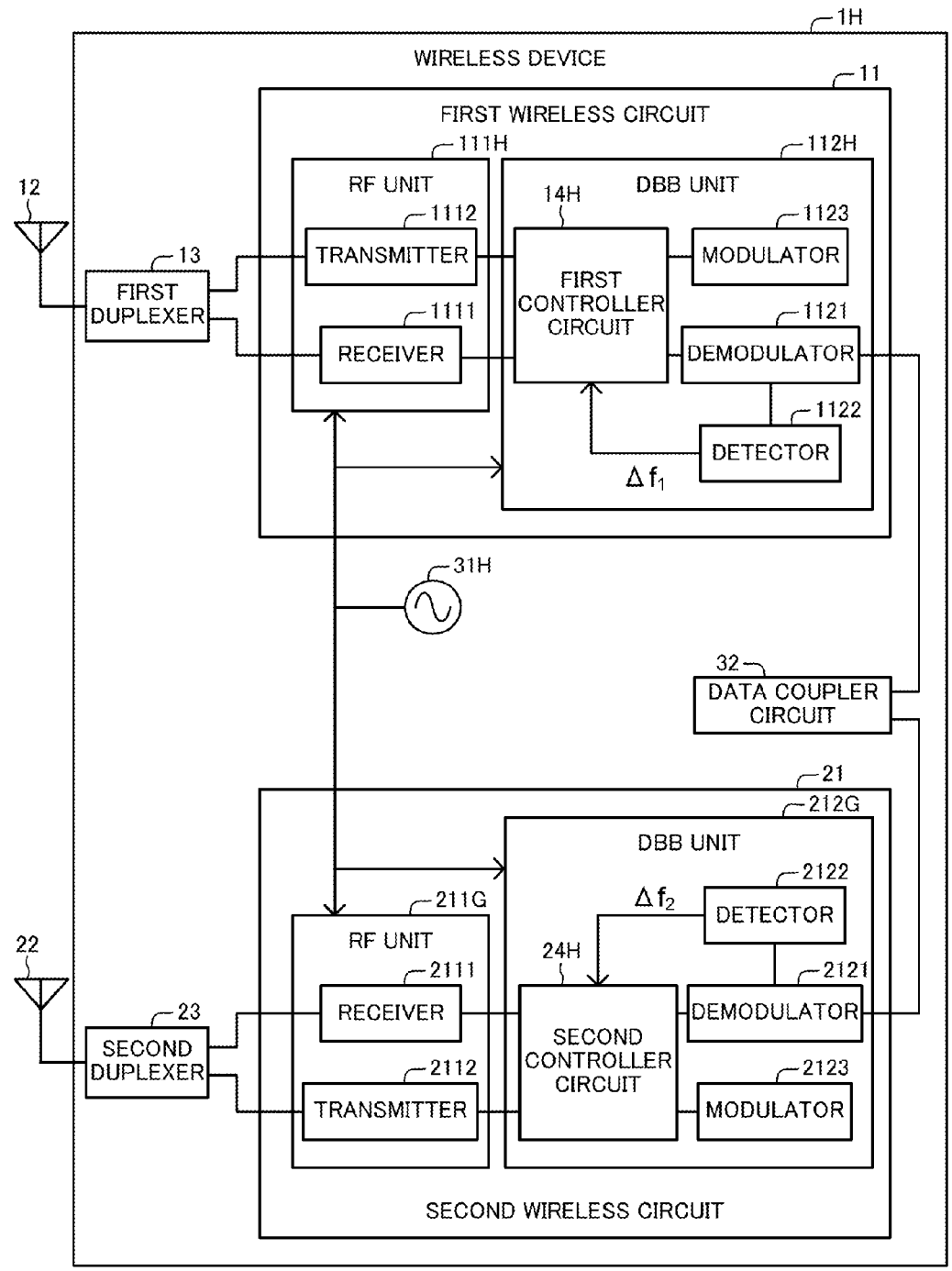
FIG. 29 is a block diagram schematically illustrating an example of the configuration of a wireless device according to a first modification to the third embodiment.

As illustrated in FIG. 29, the wireless device 1H of the first modification to the third embodiment exemplarily includes an RF unit 111H and a DBB unit 112H in place of the first controller circuit 14, the RF unit 111, and the DBB unit 112 of FIG. 21. In addition, the wireless device 1H exemplarily includes a second controller circuit 24H and an oscillator circuit 31H in place of the second controller circuit 24G and the oscillator circuit 31 of FIG. 21.

The oscillator circuit 31H generates a clock signal having a certain frequency. The oscillator circuit 31H of this modification includes a quartz oscillator. An example of the oscillator is a TCXO or a VC-TCXO.

The first wireless circuit 11 of this modification operates in response to the clock signal generated by the oscillator circuit 31H.

The RF unit 111H has the same function as that of the RF unit 111 of FIG. 21 except for the point that the RF unit 111H carries out, at a sampling frequency higher than the frequency of the clock signal synchronized with the demodulating process by the demodulator 1121, AD conversion on the received signal output from the receiver 1111.

The DBB unit 112H exemplarily includes a first controller circuit 14H in addition to the elements included in the DBB unit 112 of FIG. 21.

The first controller circuit 14H includes a reception timing adjustor circuit and a transmission timing adjustor circuit likewise the second controller circuit 24G of FIG. 22. The first controller circuit 14H has the same function as that of the second controller circuit 24G except for the point that the first controller circuit 14H generates selection information based on the first phase difference $\Delta f_1$ irrespectively of the second phase difference $\Delta f_2$. In this modification, a positive phase difference means that the phase of the received signal is advanced over the corresponding reference phase.

In this modification, if the absolute value of the value $\Delta f_1$ is equal to or less than a certain threshold, the first controller circuit 14H generates selection information that specifies a predetermined FF circuit (e.g., the FF circuit disposed in the middle of the J FF circuits). Furthermore, if the value $\Delta f_1$ has an absolute value larger than the threshold and is also positive, the first controller circuit 14H of this modification generates the selection information that specifies a more downstream FF circuit as the value $\Delta f_1$ increases. In contrast, if the value $\Delta f_1$ has an absolute value larger than the threshold and also is negative, the first controller circuit 14H of this modification generates the selection information that specifies a more upstream FF circuit as the value $\Delta f_1$ decreases.

The first controller circuit 14H may store the relationship between the value $\Delta f_1$ and the selection information in advance and generate the selection information based on the stored relationship and the detected first phase difference $\Delta f_1$.

The second controller circuit 24H has the same function as that of the first controller circuit 14H except for the point that the second controller circuit 24H uses the second phase difference $\Delta f_2$ in place of the first phase difference $\Delta f_1$.

(Operation)

An example of the operation of the wireless device 1H will now be described with reference to FIGS. 29 and 30.

Figure 30:
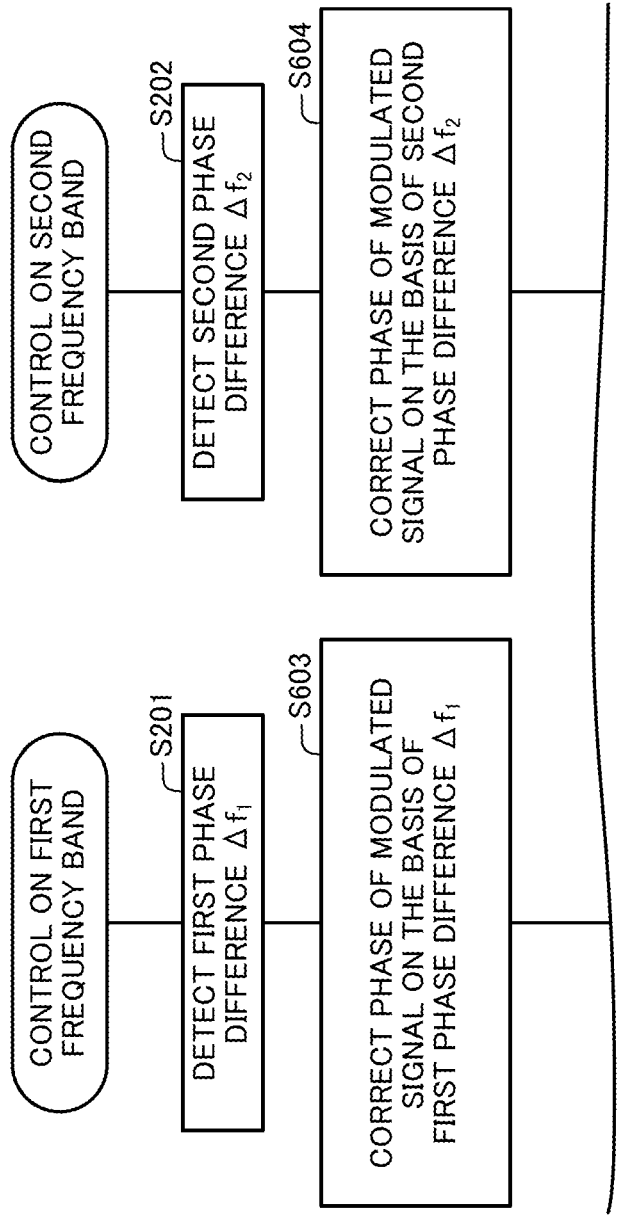
FIG. 30 is a sequential diagram illustrating a succession of procedural steps performed by a wireless device of FIG. 29.

The wireless device 1H operates the same as steps S201 to S202 of FIG. 12 (steps S201 to S202 of FIG. 30).

The first controller circuit 14H corrects the phase of the modulated signal of the first wireless circuit 11 on the basis of the first phase difference $\Delta f_1$ detected by the detector 1122 (step S603 of FIG. 30). As the above, the first controller circuit 14H controls the first wireless process by correcting the phase of the modulated signal in the first wireless circuit 11 in the above manner.

Likewise, the second controller circuit 24H corrects the phase of the modulated signal of the second wireless circuit 21 on the basis of the second phase difference $\Delta f_2$ detected by the detector 2122 (step S604 of FIG. 30). The second controller circuit 24H controls the second wireless process by correcting the phase of the modulated signal of the second wireless circuit 21 in the above manner.

Accordingly, the wireless device 1H of the first modification to the third embodiment ensures the same advantages and effects as those of the wireless device 1G of the third embodiment.

In addition, the wireless device 1H of the first modification to the third embodiment can precisely compensate for the phase differences of the received wireless signals of the first and the second frequency bands.

<Fourth Embodiment>

Next, description will now be made in relation to a wireless device according to a fourth embodiment. The wireless device of the fourth embodiment is different from the wireless device of the first embodiment in the point that the wireless device of the fourth embodiment controls the second wireless process by correcting the phase of the modulated signal of the second wireless circuit. Hereinafter, the description will mainly focus on the difference. In the fourth embodiment, like reference numbers designate the same or the substantially same elements and parts of the first embodiment.

(Configuration)

Figure 31:
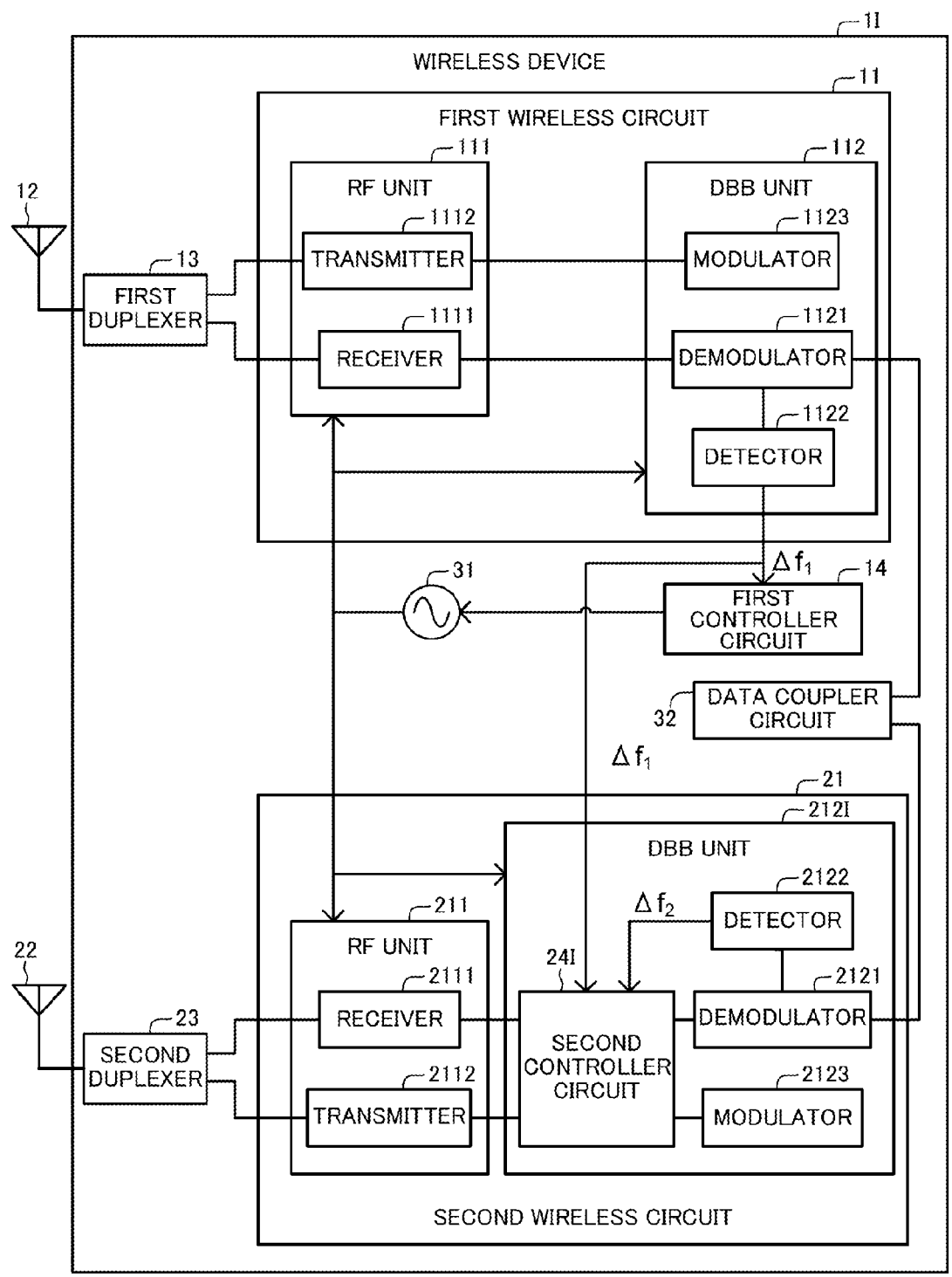
FIG. 31 is a block diagram schematically illustrating an example of the configuration of a wireless device according to a fourth embodiment.

As illustrated in FIG. 31, a wireless device 1I of the fourth embodiment exemplarily includes a DBB unit 212I in place of the second controller circuit 24 and the DBB unit 212 of FIG. 2.

The second wireless circuit 21 of the fourth embodiment operates in response to the clock signal generated by the oscillator circuit 31.

The DBB unit 212I exemplarily includes a second controller circuit 24I in addition to the elements included in the DBB unit 212 of FIG. 2.

Figure 32:
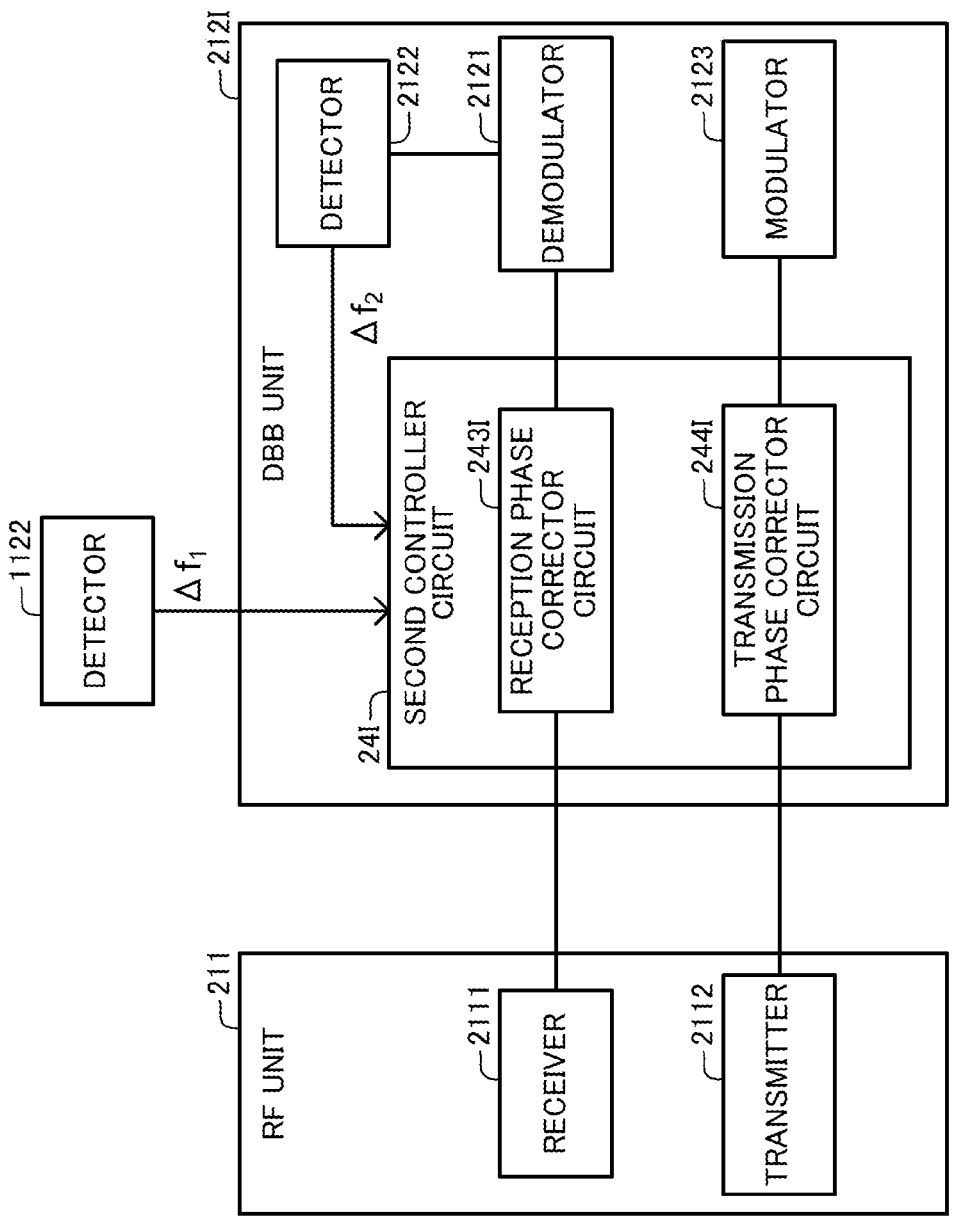
FIG. 32 is a block diagram schematically illustrating an example of the configuration of an RF unit and a DBB unit of FIG. 31.

As illustrated in FIG. 32, the second controller circuit 24I exemplarily includes a reception phase corrector circuit 243I and a transmission phase corrector circuit 244I.

The second controller circuit 24I generates correction information that represents an amount of correcting the phase of the modulated signal on the basis of the first phase difference $\Delta f_1$ detected by the detector 1122 and the second phase difference $\Delta f_2$ detected by the detector 2122.

In this embodiment, the second controller circuit 24I generates the correction information based on the difference $\Delta f_2 - \Delta f_1$ obtained by subtracting the first phase difference $\Delta f_1$ from the second phase difference $\Delta f_2$.

In this embodiment, a positive phase difference means that the phase of the received signal is advanced over the corresponding reference phase.

In this embodiment, the second controller circuit 24I generates the correction information representing a larger amount of correcting as the value $\Delta f_2 - \Delta f_1$ increases. For example, the amount of correcting takes a value of from 0 to $2\pi$.

The second controller circuit 24I may store the relationship between the value $\Delta f_2 - \Delta f_1$ and the correction information in advance and generate the correction information based on the stored relationship and the difference $\Delta f_2 - \Delta f_1$ calculated from the detected first phase difference $\Delta f_1$ and the detected second phase difference $\Delta f_2$.

The second controller circuit 24I may use the value $\Delta f_2 - k\Delta f_1$ in place of the value $\Delta f_2 - \Delta f_1$ to generate the correction information. Here, k represents a certain factor and may be determined on the basis of a frequency of the first frequency band and a frequency of the second frequency band. Alternatively, the factor k may be based on a ratio of the frequency of a carrier wave signal for the first frequency band to the frequency of a carrier wave signal for the second frequency band.

The reception phase corrector circuit 243I multiplies the received data output from the receiver 2111 by a complex number $\exp(\xi\Delta\theta)$ corresponding to the amount $\Delta\theta$ of correcting represented by the correction information generated by the second controller circuit 24I and then outputs the multiplied received data to the demodulator 2121.

The received data of this embodiment is a received signal which has undergone the AD conversion and which has been output from the receiver 2111. The received data, which is not demodulated yet in this embodiment, is also referred to as a modulated signal. The symbol $\xi$ represents the imaginary unit. The reception phase corrector circuit 243I of this embodiment includes a complex multiplier. The multiplication of an imaginary number is an example of the arithmetically processing.

The reception phase corrector circuit 243I corrects the phase of the modulated signal by multiplying the received data by a complex number.

The transmission phase corrector circuit 244I operates the same as the reception phase corrector circuit 243I except for the following first and second differences.

The first difference is that the transmission data in place of the received data is input from the modulator 2123 into the transmission phase corrector circuit 244I. In this embodiment, the transmission data is a transmission signal output from the modulator 2123 and is also referred to as a modulated signal. The second difference is that the transmission data is output to the transmitter 2112 in place of the demodulator 2121.

In the above manner, the transmission phase corrector circuit 244I corrects the phase of the modulated signal by multiplying the transmission data by a complex number.

As the above, the wireless device 1I of the fourth embodiment ensures the same effects and advantages as those of the wireless device 1G of the third embodiment.

Alternatively, the second controller circuit 24I may correct the phase of one of the received data and the transmission data, not correcting the phase of the other data.

Figure 33:
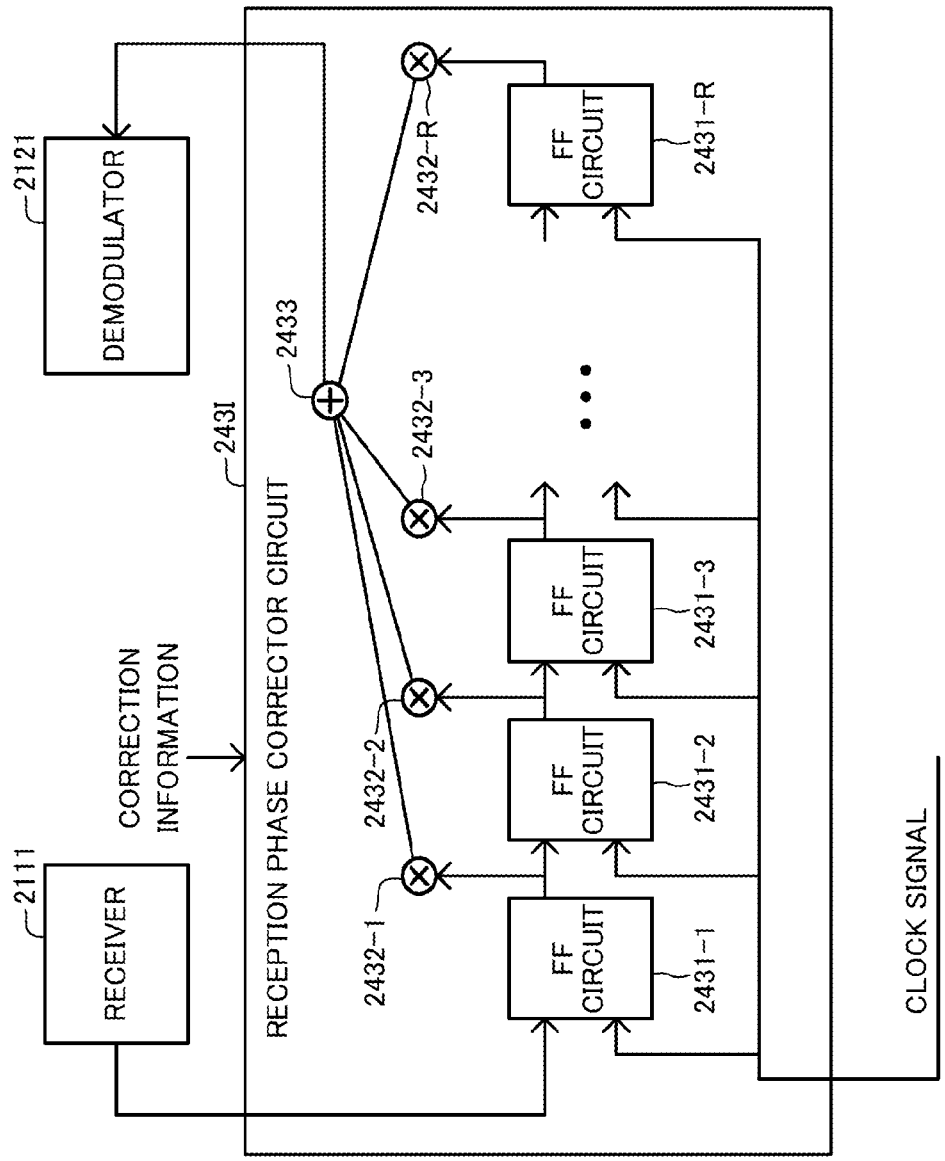
FIG. 33 is a block diagram schematically illustrating a modification to a reception phase corrector circuit of FIG. 32.

The reception phase corrector circuit 243I may include a digital filter in place of a complex multiplier. A process performed by the digital filter is an example of arithmetically processing. As illustrated in FIG. 33, an example of the digital filter is a Finite Impulse Response (FIR) filter. The FIR filter exemplarily includes R FF circuits 2431-1 to 2431-R, R multipliers 2432-1 to 2432-R, and an adder 2433. Here, the symbol R represents an integer equal to or more than two.

The R FF circuits 2431-1 to 2431-R are connected to one another in series. Received data is input from the receiver 2111 to the FF circuit 2431-1. Into each FF circuit 2431-$i$, received data output from the FF circuit 2431-$p$ is input. The symbol i represents an integer of from 2 to R, and the symbol p is equal to i−1.

A clock signal is input into each FF circuit 2431-$r$. Here, r represents an integer of from 1 to R. The FF circuit 2431-$r$ delays the received data input therein for the cycle length of the input clock signal and then outputs the delayed data. In this embodiment, the R FF circuits 2431-1 to 2431-R may be collectively referred to as a shift register.

The correction information of this example represents respective filter coefficients used by the R multipliers 2432-1 to 2432-R.

The R multipliers 2432-1 to 2432-R multiply received data output from the respective FF circuits 2431-1 to 2431-R by the respective filter coefficients represented by the correction information.

The adder 2433 adds the received data obtained by multiplication by the respective filter coefficients in the R multipliers 2432-1 to 2432-R, and outputs the added received data to the demodulator 2121.

The reception phase corrector circuit 243I may correct the phase of the modulated signal by processing the received data with the FIR filter in the above manner.

<First Modification to the Fourth Embodiment>

Next, description will now be made in relation to a wireless device according to a first modification to the fourth embodiment. The wireless device of the first modification to the fourth embodiment is different from the wireless device of the fourth embodiment in the point that the wireless device of this modification corrects the phases of modulated signals of the first and the second frequency bands in parallel with each other. Hereinafter, the description will mainly focus on the difference. In this modification, like reference numbers designate the same or the substantially same elements and parts of the fourth embodiment.

Figure 34:
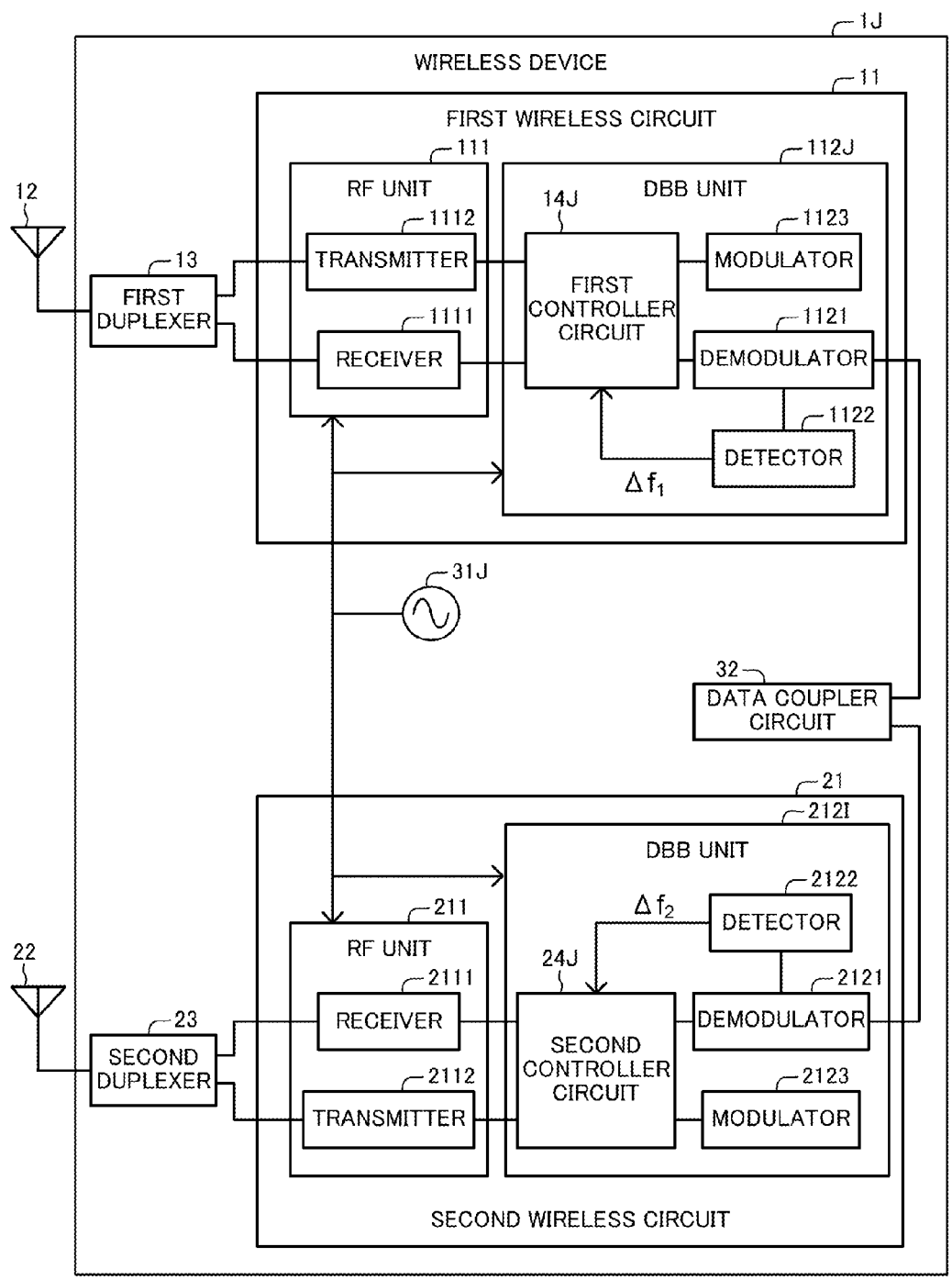
FIG. 34 is a block diagram schematically illustrating an example of the configuration of a wireless device according to a first modification to the fourth embodiment.

As illustrated in FIG. 34, a wireless device 1J of the first modification to the fourth embodiment exemplarily includes a DBB unit 112J in place of the first controller circuit 14 and the DBB unit 112 of FIG. 31. In addition, the wireless device 1J exemplarily includes a second controller circuit 24J and an oscillator circuit 31J in place of the second controller circuit 24I and the oscillator circuit 31 of FIG. 31.

The oscillator circuit 31J generates a clock signal having a certain frequency. The oscillator circuit 31J of this modification includes a quartz oscillator. An example of the oscillator is a TCXO or a VC-TCXO.

The first wireless circuit 11 of this modification operates in response to the clock signal generated by the oscillator circuit 31J.

The DBB unit 112J exemplarily includes a first controller circuit 14J in addition to the elements included in the DBB unit 112 of FIG. 31.

The first controller circuit 14J includes a reception phase corrector circuit and a transmission phase corrector circuit likewise the second controller circuit 24I of FIG. 32. The first controller circuit 14J has the same function as that of the second controller circuit 24I except for the point that the first controller circuit 14J generates the correction information based on the first phase difference $\Delta f_1$ irrespectively of the second phase difference $\Delta f_2$. In this modification, a positive phase difference means that the phase of the received signal is advanced over the corresponding reference phase.

In this modification, the first controller circuit 14J generates correction information representing a larger amount of correcting as the value $\Delta f_1$ increases. The first controller circuit 14J may store the relationship between the value $\Delta f_1$ and the correction information in advance and generate the correction information based on the stored relationship and the detected first phase difference $\Delta f_1$.

The second controller circuit 24J has the same function as that of the first controller circuit 14J except for the point that the second controller circuit 24J uses the second phase difference $\Delta f_2$ in place of the first phase difference $\Delta f_1$.

The wireless device 1J of the first modification to the fourth embodiment can ensure the same effects and advantages as those of the wireless device 1I of the fourth embodiment.

In addition, the wireless device 1J of the first modification to the fourth embodiment can precisely compensate for the phase differences of the received wireless signals of the first and the second frequency bands.

The wireless devices of the foregoing embodiments each control the wireless processes so as to compensate for the respective phase differences of two frequency bands, but may alternatively control wireless processes so as to compensate for the respective phase differences of three or more frequency bands.

At least one of the wireless devices of the foregoing embodiments controls both a receiving process and a transmitting process so as to compensate for phase differences of multiple frequency bands, but may alternatively control one of the receiving process and the transmitting process.

According to the above disclosure, the communication quality under a state of using multiple frequency bands can be enhanced.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A wireless device comprising:
    an oscillator circuit that generates a clock signal;
    a detector circuit that detects respective phase differences of received wireless signals of a plurality of frequency bands from respective reference phases, each of the phase differences corresponding to a difference between a first frequency of a signal generated by another wireless device being a communication counterpart to the wireless device and a second frequency of a signal generated by the wireless device;
a first wireless circuit that operates in response to the clock signal and that carries out a first wireless process including at least one of a receiving process and a transmitting process on the wireless signal of a first frequency band among the plurality of frequency bands;
a second wireless circuit that operates in response to the clock signal and that carries out a second wireless process including at least one of a receiving process and a transmitting process on the wireless signal of a second frequency band among the plurality of frequency bands; and
a controller circuit that controls, for each of the plurality of frequency bands, at least one of a receiving process and a transmitting process on the wireless signal on the basis of the clock signal such that the phase difference is compensated, wherein
the controller circuit comprises
a first controller circuit that controls the first wireless process to compensate for the phase difference of the first frequency band, and
a second controller circuit that controls the second wireless process to compensate for the phase difference of the second frequency band.

2. The wireless device according to claim 1, wherein:
the first controller circuit controls the first wireless process by correcting the frequency of the clock signal to be supplied to the first wireless circuit; and
the second controller circuit controls the second wireless process by correcting the frequency of the clock signal to be supplied to the second wireless circuit.

3. The wireless device according to claim 2, wherein:
the first controller circuit controls the oscillator circuit such that the frequency of the clock signal that is to be generated by the oscillator circuit is corrected on the basis of the phase difference of the first frequency band; and
the second controller circuit corrects the frequency of the clock signal output from the oscillator circuit on the basis of the phase difference of the first frequency band and the phase difference of the second frequency band, and supplies the corrected clock signal to the second wireless circuit.

4. The wireless device according to claim 2, wherein:
the first controller circuit corrects the frequency of the clock signal output from the oscillator circuit on the basis of the phase difference of the first frequency band, and supplies the corrected clock signal to the first wireless circuit; and
the second controller circuit corrects the frequency of the clock signal output from the oscillator circuit on the basis of the phase difference of the second frequency band, and supplies the corrected clock signal to the second wireless circuit.

5. The wireless device according to claim 1, wherein:
the first control circuit controls the first wireless process by correcting the frequency of the clock signal to be supplied to the first wireless circuit; and
the second control circuit controls the second wireless process by correcting the frequency of a carrier wave signal that is to be generated by the second wireless circuit.

6. The wireless device according to claim 5, wherein:
the first controller circuit controls the oscillator circuit such that the frequency of the clock signal that is to be generated by the oscillator circuit is corrected on the basis of the phase difference of the first frequency band; and
the second controller circuit controls the second wireless circuit such that the frequency of a carrier wave signal that is to be generated by the second wireless circuit is corrected on the basis of the phase difference of the first frequency band and the phase difference of the second frequency band.

7. The wireless device according to claim 1, wherein
the first controller circuit controls the first wireless process by correcting the frequency of a first carrier wave signal that is to be generated by the first wireless circuit; and
the second controller circuit controls the second wireless process by correcting the frequency of a second carrier wave signal that is to be generated by the second wireless circuit.

8. The wireless device according to claim 7, wherein
the first controller circuit controls the first wireless circuit such that the frequency of the first carrier wave signal is corrected on the basis of the phase difference of the first frequency band;
the second controller circuit controls the second wireless circuit such that the frequency of the second carrier wave signal is corrected on the basis of the phase difference of the second frequency band.

9. The wireless device according to claim 1, wherein:
the first controller circuit controls the first wireless process by correcting the frequency of the clock signal to be supplied to the first wireless circuit; and
the second controller circuit controls the second wireless process by correcting the phase of a modulated signal of the second wireless circuit.

10. The wireless device according to claim 9, wherein:
the first controller circuit controls the oscillator circuit such that the frequency of the clock signal that is to be generated by the oscillator circuit on the basis of the phase difference of the first frequency band; and
the second controller circuit controls the second wireless circuit such that the phase of the modulated signal is corrected on the basis of the phase difference of the first frequency band and the phase difference of the second frequency band.

11. The wireless device according to claim 10, wherein:
the second wireless circuit generates a signal, as the modulated signal, including a value at a timing having a second frequency higher than a first frequency, which is a frequency of a clock signal synchronized with at least one of a wireless transmitting process and a demodulating process, and processes a value at a timing having the first frequency, the value being included in the generated modulated signal; and
the second controller circuit corrects the phase of the modulated signal by changing the timing corresponding to the value that is to be processed by the second wireless circuit.

12. The wireless device according to claim 10, wherein the second controller circuit corrects the phase of the modulated signal by arithmetically processing the modulated signal of the second wireless circuit.

13. The wireless device according to claim 1, wherein:
the first controller circuit controls the first wireless process by correcting the phase of a first modulated signal of the first wireless circuit; and
the second controller circuit controls the second wireless process by correcting the phase of a second modulated signal of the second wireless circuit.

14. The wireless device according to claim 13, wherein:
the first controller circuit controls the first wireless circuit such that the phase of the first modulated signal is corrected on the basis of the phase difference of the first frequency band; and
the second controller circuit controls the second wireless circuit such that the phase of the second modulated signal is corrected on the basis of the phase difference of the second frequency band.

15. The wireless device according to claim 14, wherein:
the first wireless circuit generates a signal, as the first modulated signal, including a value at a timing having a second frequency higher than a first frequency, which is a frequency of a clock signal synchronized with at least one of a wireless transmitting process and a demodulating process, and processes a value at a timing having the first frequency, the value being included in the generated first modulated signal;
the second wireless circuit generates a signal, as the second modulated signal, including a value at a timing having a fourth frequency higher than a third frequency, which is a frequency of a clock signal synchronized with at least one of a wireless transmitting process and a demodulating process, and processes a value at a timing having the third frequency, the value being included in the generated second modulated signal;
the first controller circuit corrects the phase of the first modulated signal by changing the timing corresponding to the value that is to be processed by the first wireless circuit; and
the second controller circuit corrects the phase of the second modulated signal by changing the timing corresponding to the value that is to be processed by the second wireless circuit.

16. The wireless device according to claim 14, wherein:
the first controller circuit corrects the phase of the first modulated signal by arithmetically processing the first modulated signal; and
the second controller circuit corrects the phase of the second modulated signal by arithmetically processing the second modulated signal.

17. A method for controlling a wireless device comprising an oscillator circuit that generates a clock signal, the method comprising:
detecting respective phase differences of wireless signals of a plurality of frequency bands from respective reference phases, the wireless signals being received by the wireless device, each of the phase differences corresponding to a difference between a first frequency of a signal generated by another wireless device being a communication counterpart to the wireless device and a second frequency of a signal generated by the wireless device; and
controlling, for each of the plurality of frequency bands, at least one of a receiving process and a transmitting process on the wireless signal on the basis of the clock signal such that the phase difference is compensated, wherein the controlling comprises:
controlling a first wireless process performed by a first wireless circuit that operates in response to the clock signal to compensate for the phase difference of a first frequency band among the plurality of frequency bands, the first wireless process including at least one of a receiving process and a transmitting process on the wireless signal of the first frequency band; and
controlling a second wireless process performed by a second wireless circuit that operates in response to the clock signal to compensate for the phase difference of a second frequency band among the plurality of frequency bands, the second wireless process including at least one of a receiving process and a transmitting process on the wireless signal of the second frequency band.

\* \* \* \* \*